(12) United States Patent
Verma et al.

(10) Patent No.: US 10,944,796 B2
(45) Date of Patent: Mar. 9, 2021

(54) NETWORK SLICE-BASED SECURITY IN MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 203 days.

(21) Appl. No.: 16/144,143

(22) Filed: Sep. 27, 2018

(65) Prior Publication Data
US 2020/0106812 A1 Apr. 2, 2020

(51) Int. Cl.
*H04L 29/06* (2006.01)
*H04W 12/00* (2009.01)
(Continued)

(52) U.S. Cl.
CPC ............ *H04L 63/205* (2013.01); *H04L 63/02* (2013.01); *H04L 63/10* (2013.01);
(Continued)

(58) Field of Classification Search
CPC ......... H04W 12/0808; H04W 12/1201; H04W 12/009; H04W 24/08; H04L 63/10;
(Continued)

(56) References Cited

U.S. PATENT DOCUMENTS 9,516,053 B1 12/2016 Muddu
9,607,104 B1 3/2017 Turner
(Continued)

FOREIGN PATENT DOCUMENTS

KR 101275708 6/2013
WO 2017200978 11/2017

OTHER PUBLICATIONS

3GPP, 3GPP TS 29.244, V15.3.0, 3rd Generation Partnership Project; Technical Specification Group Core Network and Terminals; Interface between the Control Plane and the User Plane Nodes; Stage 3, Release 15, Sep. 2018.
(Continued)

*Primary Examiner* — Kambiz Zand
*Assistant Examiner* — Benjamin A Kaplan
(74) *Attorney, Agent, or Firm* — Van Pelt, Yi & James LLP

(57) ABSTRACT

Techniques for providing network slice-based security in mobile networks (e.g., service provider networks for mobile subscribers) are disclosed. In some embodiments, a system/process/computer program product for network slice-based security in mobile networks in accordance with some embodiments includes monitoring network traffic on a service provider network at a security platform to identify a new session, wherein the service provider network includes a 5G network or a converged 5G network; extracting network slice information for user traffic associated with the new session at the security platform; and determining a security policy to apply at the security platform to the new session based on the network slice information.

16 Claims, 20 Drawing Sheets

(51) Int. Cl.
*H04W 12/12* (2009.01)
*H04W 12/08* (2009.01)
*H04W 24/08* (2009.01)
*H04W 12/088* (2021.01)
*H04W 12/121* (2021.01)
*H04L 29/08* (2006.01)

(52) U.S. Cl.
CPC ...... *H04L 63/1416* (2013.01); *H04L 63/1458* (2013.01); *H04W 12/009* (2019.01); *H04W 12/088* (2021.01); *H04W 12/121* (2021.01); *H04W 24/08* (2013.01); *H04L 67/02* (2013.01)

(58) Field of Classification Search
CPC ............... H04L 63/1458; H04L 63/205; H04L 63/1416; H04L 63/02; H04L 67/02
USPC .......................................................... 726/1
See application file for complete search history.

(56) References Cited

U.S. PATENT DOCUMENTS

| | | |
|---|---|---|
| 10,142,687 B2 | 11/2018 | Gurha |
| 10,567,479 B2 | 2/2020 | Tal |
| 2008/0109871 A1* | 5/2008 | Jacobs .................... H04L 63/20 726/1 |
| 2010/0030578 A1 | 2/2010 | Siddique |
| 2011/0153362 A1 | 6/2011 | Valin |
| 2014/0143826 A1 | 5/2014 | Sharp |
| 2016/0210602 A1 | 7/2016 | Siddique |
| 2017/0041304 A1 | 2/2017 | Tal |
| 2017/0041381 A1 | 2/2017 | Tal |
| 2017/0111390 A1* | 4/2017 | Frydman ........... H04W 12/1202 |
| 2017/0141973 A1 | 5/2017 | Vrzic |
| 2017/0164349 A1 | 6/2017 | Zhu |
| 2017/0200228 A1 | 7/2017 | Bryant |
| 2017/0245316 A1 | 8/2017 | Salkintzis |
| 2017/0332238 A1* | 11/2017 | Bansal ................ H04L 63/0272 |
| 2017/0332312 A1 | 11/2017 | Jung |
| 2017/0374429 A1 | 12/2017 | Yang |
| 2018/0097840 A1* | 4/2018 | Murthy ................... H04L 63/02 |
| 2018/0227302 A1 | 8/2018 | Lee |
| 2018/0234459 A1 | 8/2018 | Kung |
| 2018/0242162 A1* | 8/2018 | Ashrafi ............... H04L 41/0896 |
| 2018/0270073 A1 | 9/2018 | Senarath |
| 2018/0270744 A1 | 9/2018 | Griot |
| 2018/0288095 A1 | 10/2018 | Shaw |
| 2018/0302877 A1 | 10/2018 | Bosch |
| 2018/0332442 A1 | 11/2018 | Shaw |
| 2018/0332523 A1 | 11/2018 | Faccin |
| 2018/0367570 A1 | 12/2018 | Verma |
| 2018/0367578 A1 | 12/2018 | Verma |
| 2019/0021010 A1 | 1/2019 | Senarath |
| 2019/0053010 A1 | 2/2019 | Edge |
| 2019/0053104 A1 | 2/2019 | Qiao |
| 2019/0053147 A1 | 2/2019 | Qiao |
| 2019/0109768 A1 | 4/2019 | Senarath |
| 2019/0109823 A1 | 4/2019 | Qiao |
| 2019/0109868 A1 | 4/2019 | Muddu |
| 2019/0335392 A1 | 10/2019 | Qiao |
| 2020/0044943 A1 | 2/2020 | Bor-Yaliniz |
| 2020/0084131 A1* | 3/2020 | Bisht .................... H04L 43/028 |

OTHER PUBLICATIONS

3GPP, 3GPP TS 23.003, V15.2.0, 3rd Generation Partnership Project; Technical Specification Group Core Network and Terminals; Numbering Addressing and Identification (Release 15), p. 1-116, Dec. 2017.

3GPP, ETSI TS 123 501, V15.3.0, Technical Specification, 5G; System Architecture for the 5G System, (3GPP TS 23.501 version 15.3.0 Release 15), Sep. 2018.

3GPP, 3GPP TS 23.003, V15.5.0, Technical Specification, 3rd Generation Partnership Project; Technical Specification Group Core Network and Terminals; Numbering, Addressing and Identification, (Release 15), Sep. 2018, retrieved on Sep. 25, 2018.

3GPP, 3GPP TS 23.501, V15.3.0, Technical Specification, 3rd Generation Partnership Project; Technical Specification Group Services and System Aspects; System Architecture for the 5G System, Stage 2, (Release 15), Sep. 2018, retrieved on Sep. 25, 2018.

3GPP, 3GPP TS 23.502, V15.3.0, Technical Specification, 3rd Generation Partnership Project; Technical Specification Group Services and System Aspects; Procedures for the 5G System, Stage 2, (Release 15), Sep. 2018, retrieved on Sep. 25, 2018.

3GPP, 3GPP TS 29.571, V15.1.0, Technical Specification, 3rd Generation Partnership Project; Technical Specification Group Core Network and Terminals; 5G System; Common Data Types for Service Based Interfaces; Stage 3, (Release 15), Sep. 2018, retrieved on Sep. 24, 2018.

Belshe et al., Internet Engineering Task Force, RFC7540, Hypertext Transfer Protocol Version 2 (HTTP/2), May 2015.

Chen et al., Software-Defined Mobile Networks Security, Mobile Netw Appl, (2016), 21:729-743, Jan. 9, 2016.

Gai et al., Intrusion Detection Techniques for Mobile Cloud Computing in Heterogeneous 5G, Research Article, Security and Communication Networks, Security Comm. Networks 2016, 9:3049-3058, Feb. 11, 2015.

Horn et al., Towards 5G Security, IEEE, 2015 IEEE Presented at the 14th IEEE International Conference on Trust, Security, and Privacy in Computing and Communications, Aug. 20-22, 2015.

Information Sciences Institute, RFC:793, Transmission Control Protocol, Darpa Internet Program, Protocol Specification, Sep. 1981.

3GPP, 3GPP TS 23.501 V2.0.1 (Dec. 2017), Technical Specification, 3rd Generation Partnership Project; Technical Specification Group Services and System Aspects; System Architecture for the 5G System; Stage 2 (Release 15), pp. 1-183.

* cited by examiner

NETWORK SLICE-BASED SECURITY IN MOBILE NETWORKS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
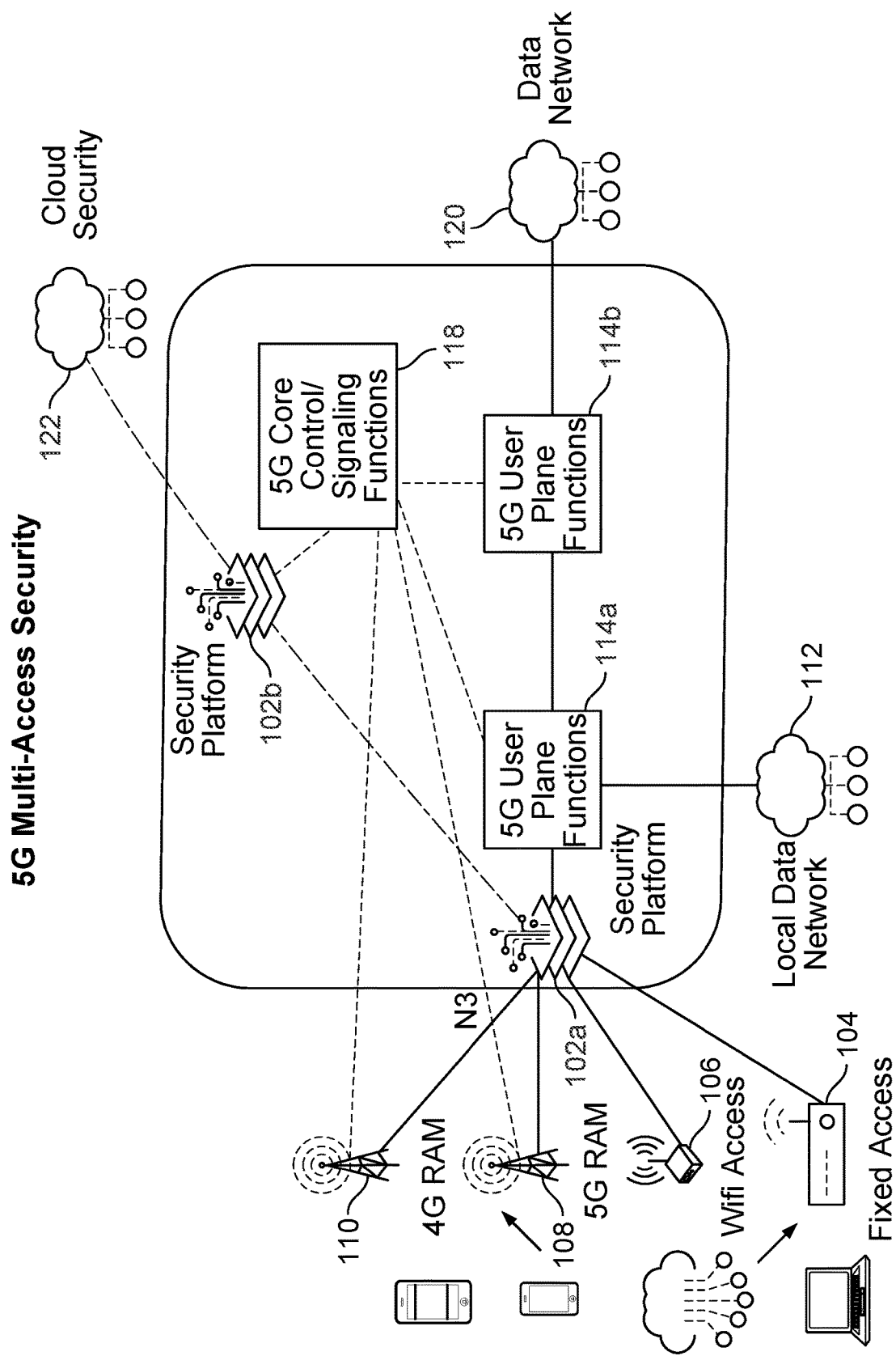
FIG. 1A is a block diagram of a 5G wireless network with a security platform for providing 5G multi-access security in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates.

Thus, technical and security challenges with service provider networks exist for devices in mobile networks. As such, what are needed are new and improved security techniques for devices in such service provider network environments (e.g., mobile networks). Specifically, what are needed are new and improved solutions for monitoring service provider network traffic and applying security policies (e.g., firewall policies) for devices communicating on service provider networks.

Overview of Techniques for Network Slice-Based Security in Mobile Networks

Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide network slice-based security in mobile networks for service providers, such as for 5G cellular networks, are disclosed. More specifically, various system architectures for implementing and various processes for providing security platforms within service provider network environments for network slice-based security in mobile networks for service providers, such as for 5G cellular networks, are disclosed.

In some embodiments, various techniques are disclosed for applying network slice-based security that can be applied using a security platform by parsing HTTP/2 messages to extract network slice information. For example, in 5G cellular networks, HTTP/2 shall be used in the service-based interface.

Specifically, HTTP/2 as described in IETF RFC 7540 (e.g., available at https://tools.ietf.org/html/rfc7540) is a binary protocol that supports multiplexing multiple streams over a single connection, header compression and unrequested push from servers to clients. HTTP/2 will use TCP as described in IETF RFC 793 (e.g., available at https://tools.ietf.org/html/rfc793) as the transport protocol. Network Slice is a logical network within a Public Land Mobile Network (PLMN) including Core Network Control Plane and User Plane Network Functions, and in serving PLMN at least one of either NG Radio Access Network or Non-3GPP Interworking Function (N3IWF) to the non-3GPP Access Network.

More specifically, Network Slice is identified by Single Network Slice Selection Assistance Information (S-NSSAI). An S-NSSAI is composed of: (1) a Slice/Service type (SST)—It refers to the expected Network Slice behavior in terms of features and services; and (2) a Slice Differentiator (SD) (e.g., it is optional information to differentiate between multiple Network Slices of the same SST).

Further, S-NSSAI can have standard or non-standard values. Standardized SST values defined by 3GPP are provided below:

| Slice/<br>Service type | SST<br>value | Characteristics. |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |

In some embodiments, based on the security platform deployment topology in a given 5G network, S-NSSAI information can be extracted using one or more of two options, which are further described below. As a first option, the security platform extracts S-NSSAI information from the data type SmContextCreateData' (e.g., defined in 3GPP TS 29.502 available at https://portal.3gpp.org/desktopmodules/Specifications/SpecificationDetails.aspx?specificationId=3340) in the payload of an HTTP/2 POST request sent from the NF Service Consumer to the Session Management Function (SMF) during a 'Create SM Context Request' service operation. The 'Create SM Context Request' service operation (e.g., defined in 3GPP TS 29.502) shall be used in the following example procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF (Non-3GPP Interworking Function); and (6) Handover from EPC/ePDG (evolved packet data gateway) to 5GS.

As a second option, the security platform extracts S-NSSAI information from data type 'PduSessionCreateData' (e.g., defined in 3GPP TS 29.502) in the payload of an HTTP/2 POST request sent from the NF Service Consumer to then H-SMF during the Create service operation. The Create service operation (e.g., defined in 3GPP TS 29.502) shall be used in the following example procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS.

In some embodiments, a system/process/computer program product for providing network slice-based security in mobile networks includes using a Network Slice Identifier (S-NSSAI) to apply security for a customer with multiple subscribers, mobile subscribers and subscriber's devices, such as further described below with respect to various embodiments and examples.

In one embodiment, a system/process/computer program product for providing network slice-based security in mobile networks includes providing security for a customer with multiple subscribers, mobile subscribers and subscriber's devices is performed using a security policy implemented by a security platform that can be applied per S-NSSAI in 5G networks.

In one embodiment, a system/process/computer program product for providing network slice-based security in mobile networks includes providing threat detection for a customer with multiple subscribers, mobile subscribers and subscriber's devices is performed using a security policy implemented by a security platform that can be applied per S-NSSAI in 5G networks.

In one embodiment, a system/process/computer program product for providing network slice-based security in mobile networks includes providing threat prevention for a customer with multiple subscribers, mobile subscribers and subscriber's devices is performed using a security policy implemented by a security platform that can be applied per S-NSSAI in 5G networks.

In one embodiment, a system/process/computer program product for providing network slice-based security in mobile networks includes using a Network Slice Identifier (S-NSSAI) to apply Uniform Resource Locator (URL) filtering for a customer with multiple subscribers, mobile subscribers and subscriber's devices is performed using a security policy implemented by a security platform that can be applied per S-NSSAI in 5G networks.

In one embodiment, a system/process/computer program product for providing network slice-based security in mobile networks includes providing security for a customer with multiple subscribers, mobile subscribers and subscriber's devices is performed using a security policy implemented by a security platform that can be applied per SST in 5G networks.

In one embodiment, a system/process/computer program product for providing network slice-based security in mobile networks includes providing threat detection for a customer with multiple subscribers, mobile subscribers and subscriber's devices is performed using a security policy implemented by a security platform that can be applied per SST in 5G networks.

In one embodiment, a system/process/computer program product for providing network slice-based security in mobile networks includes providing threat prevention for a customer with multiple subscribers, mobile subscribers and subscriber's devices is performed using a security policy implemented by a security platform that can be applied per SST in 5G networks.

For example, the disclosed techniques can allow 5G converged operators to provide Network slice-based security to any customer with multiple subscribers, users and/or Internet of Things (IoT) devices (e.g., Cellular IoT (CIoT) devices) who connect to their network using 5G radio access technology and handover from/to 5G to non-5G access technologies.

Example new and enhanced security services for mobile networks (e.g., for converged mobile network operators/service providers) that can be provided using the disclosed techniques include one or more of the following: (1) Network Slice-based firewall service; (2) Network Slice-based basic threat detection service for known threats; (3) Network Slice-based advanced threat detection service for unknown threats; (4) Network Slice-based basic threat prevention service for known threats; (5) Network Slice-based advanced threat prevention service for unknown threats; (6) Network Slice-based URL filtering service; (7) Network Slice-based application DoS detection service; (8) Network Slice-based application DoS prevention service; and (9) URL Filtering in NGFW could be done per SST in 5G networks.

These and other embodiments and examples for providing network slice-based security in mobile networks will be further described below.

Overview of Techniques for Service-Based Security Per Subscription and/or Equipment Identifiers in Mobile Networks for Service Providers Service-Based Security Per Subscription Permanent Identifier (SUPI)

Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide service-based security in mobile networks for service providers, such as for 5G cellular networks, are disclosed. More specifically, various system architectures for implementing and various processes for providing security platforms within service provider network environments for service-based security that can be applied using a security platform by parsing HTTP/2 messages to extract the Subscription Permanent Identifier (SUPI) information in mobile networks for service providers, such as for 5G cellular networks, are disclosed.

In some embodiments, various techniques are disclosed for applying service-based security per Subscription Permanent Identifier (SUPI) that can be applied using a security platform by parsing HTTP/2 messages to extract SUPI information. For example, in 5G cellular networks, HTTP/2 shall be used in the service-based interface.

Specifically, HTTP/2 shall be used in the service-based interface. HTTP/2 as described in IETF RFC 7540 is a binary protocol which supports multiplexing multiple streams over a single connection, header compression and unrequested push from servers to clients. HTTP/2 will use TCP as described in IETF RFC 793 as the transport protocol.

More specifically, SUPI is a globally unique 5G subscription identifier which shall be allocated to each subscriber in the 5G system and provisioned in the Universal Data Management (UDM)/Universal Data Repository (UDR). The SUPI is used inside the 3GPP system. The SUPI may include the following information: (1) an IMSI as defined in 3GPP TS 23.003 available at https://portal.3gpp.org/desktopmodules/Specifications/SpecificationDetails.aspx?specificationId=729, or (2) a network-specific identifier, used for private networks as defined in 3GPP TS 23.003 available at https://portal.3gpp.org/desktopmodules/Specifications/SpecificationDetails.aspx?specificationId=729. In some cases, a SUPI can take the form of a Network Access Identifier (NAI) using the NAI RFC 7542 based user identification as defined in 3GPP TS 23.003, for either IMSI based or non-IMSI based (e.g., when used over a non-3GPP Access Technology or for private networks) NAI. For interworking with the Evolved Packet Core (EPC), the SUPI allocated to the 3GPP User Equipment (UE) shall always be based on an IMSI to enable the UE to present an IMSI to the EPC.

In some embodiments, based on the security platform deployment topology in the 5G network, SUPI information can be extracted using the following two options. As a first option, a security platform extracts SUPI information from the data type SmContextCreateData' (e.g., defined in 3GPP TS 29.502) in the payload of the HTTP/2 POST request sent from an NF Service Consumer to Session Management Function (SMF) during the 'Create SM Context Request' service operation. For example, the 'Create SM Context Request' service operation (e.g., defined in 3GPP TS 29.502) shall be used in the following procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in Certain scenarios; (5) Handover from EPS to 5GC-N3IWF (Non-3GPP Interworking Function); and (6) Handover from EPC/ePDG (evolved packet data gateway) to 5GS, which are each further discussed below.

As a second option, a security platform extracts SUPI information from data type 'PduSessionCreateData' (e.g., defined in 3GPP TS 29.502) in the payload of the HTTP/2 POST request sent from the NF Service Consumer to the H-SMF during the Create service operation. The Create service operation (e.g., defined in 3GPP TS 29.502) shall be used in the following procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS, which are each further discussed below.

In some embodiments, a system/process/computer program product for providing service-based security per Subscription Permanent Identifier (SUPI) in mobile networks includes providing security for mobile subscribers and subscriber's devices and is performed using a security policy that can be applied using a security platform by parsing HTTP/2 messages to extract SUPI information in 5G networks.

Example new and enhanced security services for mobile networks (e.g., for converged mobile network operators/service providers) that can be provided using the disclosed techniques include one or more of the following: (1) security policies that can be applied per SUPI information for a SUPI-based firewall service; (2) SUPI-based threat detection service for known threats; (3) SUPI-based advanced threat detection service for unknown threats; (4) SUPI-based basic threat prevention service for known threats; (5) SUPI-based advanced threat prevention service for unknown threats; (6) SUPI-based URL filtering service; (7) SUPI-based application DoS detection service; and (8) SUPI-based application DoS prevention service.

Service-Based Security Per Permanent Equipment Identifier (PEI)

Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide service-based security in mobile networks for service providers, such as for 5G cellular networks, are disclosed. More specifically, various system architectures for implementing and various processes for providing security platforms within service provider network environments for service-based security that can be applied using a security platform by parsing HTTP/2 messages to extract the Permanent Equipment Identifier (PEI) information in mobile networks for service providers, such as for 5G cellular networks, are disclosed.

In some embodiments, various techniques are disclosed for applying service-based security per Permanent Equipment Identifier (PEI) that can be applied using a security platform by parsing HTTP/2 messages to extract PEI information. For example, in 5G cellular networks, HTTP/2 shall be used in the service-based interface.

Specifically, HTTP/2 shall be used in the service-based interface. HTTP/2 as described in IETF RFC 7540 is a binary protocol which supports multiplexing multiple streams over a single connection, header compression and unrequested push from servers to clients. HTTP/2 will use TCP as described in IETF RFC 793 as the transport protocol.

More specifically, PEI is a permanent equipment identifier defined for the 3GPP UE accessing the 5G System. The PEI can assume different formats for different UE types and use cases. The UE shall share the PEI to the network along with an indication of the PEI format being used. If the UE supports at least one 3GPP access technology, then the UE is allocated a PEI in the International Mobile Equipment Identifier (IMEI) format. For example, the PEI can include the following information: an IMEI or IMEISV as defined in 3GPP TS 23.003 available at https://portal.3gpp.org/desktopmodules/Specifications/SpecificationDetails.aspx?specificationId=729.

In some embodiments, based on the security platform deployment topology in a 5G network, PEI information can be extracted using the following two options. As a first option, the security platform extracts PEI information from data type 'SmContextCreateData' (e.g., defined in 3GPP TS 29.502) in the payload of the HTTP/2 POST request sent from the NF Service Consumer to the Session Management Function (SMF) during the 'Create SM Context Request' service operation. The 'Create SM Context Request' service operation (e.g., defined in 3GPP TS 29.502) shall be used in the following procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF (Non-3GPP Interworking Function); and (6) Handover from EPC/ePDG (evolved packet data gateway) to 5GS, which are each further discussed below.

As a second option, the security platform extracts PEI information from data type 'PduSessionCreateData' (e.g., defined in 3GPP TS 29.502) in the payload of the HTTP/2 POST request sent from the NF Service Consumer to the H-SMF during the Create service operation. The Create service operation (e.g., defined in 3GPP TS 29.502) shall be used in the following procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS, which are each further discussed below.

In some embodiments, a system/process/computer program product for providing service-based security per Permanent Equipment Identifier (PEI) in mobile networks includes providing security for mobile subscribers and subscriber's devices and is performed using a security policy that can be applied using a security platform by parsing HTTP/2 messages to extract PEI information in 5G networks.

Example new and enhanced security services for mobile networks (e.g., for converged mobile network operators/service providers) that can be provided using the disclosed techniques include one or more of the following: (1) security policies that can be applied per PEI information for a PEI-based firewall service; (2) PEI-based threat detection service for known threats; (3) PEI-based advanced threat detection service for unknown threats; (4) PEI-based basic threat prevention service for known threats; (5) PEI-based advanced threat prevention service for unknown threats; (6) PEI-based URL filtering service; (7) PEI-based application DoS detection service; and (8) PEI-based application DoS prevention service.

Service-Based Security Per General Public Subscription Identifier (GPSI)

Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide service-based security in mobile networks for service providers, such as for 5G cellular networks, are disclosed. More specifically, various system architectures for implementing and various processes for providing security platforms within service provider network environments for service-based security that can be applied using a security platform by parsing HTTP/2 messages to extract the General Public Subscription Identifier (GPSI) information in mobile networks for service providers, such as for 5G cellular networks, are disclosed.

In some embodiments, various techniques are disclosed for applying service-based security per General Public Subscription Identifier (GPSI) that can be applied using a security platform by parsing HTTP/2 messages to extract GPSI information. For example, in 5G cellular networks, HTTP/2 shall be used in the service-based interface.

Specifically, HTTP/2 shall be used in the service-based interface. HTTP/2 as described in IETF RFC 7540 is a binary protocol which supports multiplexing multiple streams over a single connection, header compression and unrequested push from servers to clients. HTTP/2 will use TCP as described in IETF RFC 793 as the transport protocol.

More specifically, GPSI is used for addressing a 3GPP subscription in different data networks outside of the 3GPP system. The 3GPP system stores within the subscription data the association between the GPSI and the corresponding SUPI. GPSIs are public identifiers used both inside and outside of the 3GPP system. The GPSI is either an MSISDN or an External Identifier (e.g., defined in TS 23.003). If the MSISDN is included in the subscription data, it shall be possible that the same MSISDN value is supported in both 5GS and EPS.

In some embodiments, based on the security platform deployment topology in a 5G network, GPSI information can be extracted using the following two options. As a first option, the security platform extracts GPSI information from data type 'SmContextCreateData' (e.g., defined in 3GPP TS 29.502) in the payload of the HTTP/2 POST request sent from an NF Service Consumer to Session Management Function (SMF) during the 'Create SM Context Request' service operation. The 'Create SM Context Request' service operation (e.g., defined in 3GPP TS 29.502) shall be used in the following procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF (Non-3GPP Interworking Function); and (6) Handover from EPC/ePDG (evolved packet data gateway) to 5GS, which are each further discussed below.

As a second option, the security platform extracts GPSI information from data type 'PduSessionCreateData' (e.g., defined in 3GPP TS 29.502) in the payload of the HTTP/2 POST request sent from an NF Service Consumer to H-SMF during the Create service operation. The Create service operation (e.g., defined in 3GPP TS 29.502) shall be used in the following procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS, which are each further discussed below.

In some embodiments, a system/process/computer program product for providing service-based security per General Public Subscription Identifier (GPSI) in mobile networks includes providing security for mobile subscribers and subscriber's devices and is performed using a security policy that can be applied using a security platform by parsing HTTP/2 messages to extract GPSI information in 5G networks.

Example new and enhanced security services for mobile networks (e.g., for converged mobile network operators/service providers) that can be provided using the disclosed techniques include one or more of the following: (1) security policies that can be applied per GPSI information for a GPSI-based firewall service; (2) GPSI-based threat detection service for known threats; (3) GPSI-based advanced threat detection service for unknown threats; (4) GPSI-based basic threat prevention service for known threats; (5) GPSI-based advanced threat prevention service for unknown threats; (6) GPSI-based URL filtering service; (7) GPSI-based application DoS detection service; and (8) GPSI-based application DoS prevention service.

These and other embodiments and examples for providing service-based security per subscription and/or equipment identifiers in mobile networks will be further described below.

Overview of Techniques for Service-Based Security Per Data Network Name in Mobile Networks for Service Providers Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide service-based security in mobile networks for service providers, such as for 5G cellular networks, are disclosed. More specifically, various system architectures for implementing and various processes for providing security platforms within service provider network environments for service-based security that can be applied using a security platform by parsing HTTP/2 messages to extract the Data Network Name (DNN) information in mobile networks for service providers, such as for 5G cellular networks, are disclosed.

In some embodiments, various techniques are disclosed for applying service-based security per Data Network Name (DNN) that can be applied using a security platform by parsing HTTP/2 messages to extract DNN information. For example, in 5G cellular networks, HTTP/2 shall be used in the service-based interface.

Specifically, HTTP/2 shall be used in the service-based interface. HTTP/2 as described in IETF RFC 7540 is a binary protocol which supports multiplexing multiple streams over a single connection, header compression and unrequested push from servers to clients. HTTP/2 will use TCP as described in IETF RFC 793 as the transport protocol.

More specifically, DNN is equivalent to an Access Point Name (APN) as defined in TS 23.003 available at https:// portal.3gpp.org/desktopmodules/Specifications/SpecificationDetails.aspx?specificationId=729. Both identifiers have an equivalent meaning and carry the same information. For example, the DNN may be used to: (1) select an SMF and UPF(s) for a PDU Session; or (2) determine policies to apply to this PDU Session.

In some embodiments, based on the security platform deployment topology in a 5G network, DNN information can be extracted using the following two options. As a first option, the security platform extracts DNN information from data type 'SmContextCreateData' (e.g., defined in 3GPP TS 29.502) in the payload of the HTTP/2 POST request sent from the NF Service Consumer to the Session Management Function (SMF) during the 'Create SM Context Request' service operation. The 'Create SM Context Request' service operation (e.g., defined in 3GPP TS 29.502) shall be used in the following procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF (Non-3GPP Interworking Function); and (6) Handover from EPC/ePDG (evolved packet data gateway) to 5GS, which are each further discussed below.

As a second option, the security platform extracts DNN information from data type 'PduSessionCreateData' (e.g., defined in 3GPP TS 29.502) in the payload of the HTTP/2 POST request sent from the NF Service Consumer to the H-SMF during the Create service operation. The Create service operation (e.g., defined in 3GPP TS 29.502) shall be used in the following procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS, which are each further discussed below.

In some embodiments, a system/process/computer program product for providing service-based security per Data Network Name (DNN) in mobile networks includes providing security for mobile subscribers and subscriber's devices and is performed using a security policy that can be applied using a security platform by parsing HTTP/2 messages to extract DNN information in 5G networks.

Example new and enhanced security services for mobile networks (e.g., for converged mobile network operators/service providers) that can be provided using the disclosed techniques include one or more of the following: (1) security policies that can be applied per DNN information for a DNN-based firewall service; (2) DNN-based threat detection service for known threats; (3) DNN-based advanced threat detection service for unknown threats; (4) DNN-based basic threat prevention service for known threats; (5) DNN-based advanced threat prevention service for unknown threats; (6) DNN-based URL filtering service; (7) DNN-based application DoS detection service; and (8) DNN-based application DoS prevention service.

These and other embodiments and examples for providing service-based security per network name in mobile networks will be further described below.

Overview of Techniques for Security for Service-Based Security Per User Location in Mobile Networks for Service Providers Accordingly, techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can provide service-based security in mobile networks for service providers, such as for 5G cellular networks, are disclosed. More specifically, various system architectures for implementing and various processes for providing security platforms within service provider network environments for service-based security that can be applied using a security platform by parsing HTTP/2 messages to extract the User Location information in mobile networks for service providers, such as for 5G cellular networks, are disclosed.

In some embodiments, various techniques are disclosed for applying service-based security per User Location that can be applied using a security platform by parsing HTTP/2 messages to extract User Location information. For example, in 5G cellular networks, HTTP/2 shall be used in the service-based interface.

Specifically, HTTP/2 shall be used in the service-based interface. HTTP/2 as described in IETF RFC 7540 is a binary protocol which supports multiplexing multiple streams over a single connection, header compression and unrequested push from servers to clients. HTTP/2 will use TCP as described in IETF RFC 793 as the transport protocol.

More specifically, User Location is defined as EutraLocation, NRLocation, and N3gaLocation as per 3GPP T.S 29.571 available at https://portal.3gpp.org/desktopmodules/Specifications/SpecificationDetails.aspx?specificationId=3347. For example, at least one of them shall be present in User Location. In some cases, several of them may be present, such as shown in the below examples.

EutraLocation=Tracking Area Identity (TAI)+ECGI (EUTRA Cell Identity)
NRLocation=TAI+NR Cell Identity (NCGI)
N3gaLocation—IPv4Addr, IPv6Addr, Uinteger
TAI=PLMN Identity (Plmnld)+Tracking Area Code (TAC)
ECGI=Plmnld+EUTRA Cell Identity (EutrCellId)
NCGI=Plmnld+NR Cell Identity (NrCellId)

In some embodiments, based on the security platform deployment topology in a 5G network, User Location information can be extracted using the following two options. As a first option, the security platform extracts User Location information from data type 'SmContextCreateData' (e.g., defined in 3GPP TS 29.502) in the payload of the HTTP/2 POST request sent from the NF Service Consumer to the Session Management Function (SMF) during the 'Create SM Context Request' service operation. The 'Create SM Context Request' service operation (e.g., defined in 3GPP TS 29.502) shall be used in the following procedures to create an individual Session Management (SM) context, for a given Protocol Data Unit (PDU) session, in the SMF, or in the V-SMF for Home Routed (HR) roaming scenarios: (1) UE requested PDU Session Establishment; (2) Evolved Packet System (EPS) to 5G System (5GS) idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF (Non-3GPP Interworking Function); and (6) Handover from EPC/ePDG (evolved packet data gateway) to 5GS, which are each further discussed below.

As a second option, the security platform extracts User Location information from data type 'PduSessionCreateData' (e.g., defined in 3GPP TS 29.502) in the payload of the HTTP/2 POST request sent from the NF Service Consumer to the H-SMF during the Create service operation. The Create service operation (e.g., defined in 3GPP TS 29.502) shall be used in the following procedures to create an individual PDU session in the H-SMF for HR roaming scenarios: (1) UE requested PDU Session Establishment; (2) EPS to 5GS idle mode mobility or handover using N26 interface; (3) EPS 5GS mobility without N26 interface; (4) Handover of a PDU session between 3GPP access and non-3GPP access in certain scenarios; (5) Handover from EPS to 5GC-N3IWF; and (6) Handover from EPC/ePDG to 5GS, which are each further discussed below.

In some embodiments, a system/process/computer program product for providing service-based security per User Location in mobile networks includes providing security for mobile subscribers and subscriber's devices and is performed using a security policy that can be applied using a security platform by parsing HTTP/2 messages to extract User Location information in 5G networks.

Example new and enhanced security services for mobile networks (e.g., for converged mobile network operators/service providers) that can be provided using the disclosed techniques include one or more of the following: (1) security policies that can be applied per User Location (e.g., EutraLocation or NRLocation) information for a User Location-based firewall service; (2) threat detection service for known threats performed per User Location (e.g., EutraLocation or NRLocation); (3) advanced threat detection service for unknown threats performed per User Location (e.g., EutraLocation or NRLocation); (4) basic threat prevention service for known threats performed per User Location (e.g., EutraLocation or NRLocation); (5) advanced threat prevention service for unknown threats performed per User Location (e.g., EutraLocation or NRLocation); (6) URL filtering service performed per User Location (e.g., EutraLocation or NRLocation); (7) DoS detection service performed per User Location (e.g., EutraLocation or NRLocation); and (8) application DoS prevention service performed per User Location (e.g., EutraLocation or NRLocation).

These and other embodiments and examples for providing service-based security per user location in mobile networks will be further described below.

Example System Architectures for Implementing Enhanced Security for 5G Networks for Service Providers Generally, 5G is the $5^{th}$ generation of the mobile communications system. The 3rd Generation Partnership Project (3GPP) (e.g., 3GPP includes seven telecommunications standard development organizations (ARIB, ATIS, CCSA, ETSI, TSDSI, TTA, TTC). The project covers cellular telecommunications network technologies, including radio access, the core transport network, and service capabilities. The specifications also provide hooks for non-radio access to the core network, and for interworking with Wi-Fi networks) and other organizations including ITU, IETF, and ETSI are developing 5G standards. Some of the improvements of the new 5G network standards include, for example, low latency (e.g., approximately less than 10 milliseconds (MS)), high throughput (e.g., multi-Gbps), distribution, network function virtualization infrastructure, as well as orchestration, analytics, and automation.

The 5G architecture is defined in 3GPP TS 23.501 v15.3.0 available at https://portal.3gpp.org/desktopmodules/Specifications/SpecificationDetails.aspx?specificationId=3144 as service-based and the interaction between network functions (NFs) is represented in two ways: (1) service-based representation, where NFs within the Control Plane (CP) enable other authorized network functions to access their services; and (2) reference point representation, focuses on the interactions between pairs of NFs defined by point-to-point reference points between any two network functions.

In the 5G architecture, the User Plane Protocol stack between access network and core over backbone network over N3 interface will be based on the GPRS Tunnel Protocol User Plane (GTP-U). The Control Plane NFs in the 5G system architecture shall be based on the service-based architecture. HTTP/2 will be the protocol used over service-based interfaces. A new 5G Access Network protocol will be based over Stream Control Transmission Protocol (SCTP).

Accordingly, in some embodiments, the disclosed techniques include providing a security platform (e.g., PANOS executing on an NGFW available from Palo Alto Networks, Inc. or another security platform/NFGW) configured to provide DPI capabilities (e.g., including stateful inspection) of, for example, GTP-U sessions and new HTTP/2 based TCP sessions that facilitate a correlation between monitored GTP-U tunnel sessions and new HTTP/2 based TCP sessions as further described below.

In some embodiments, a security platform (e.g., PANOS executing on an NGFW available from Palo Alto Networks, Inc. or another security platform/NFGW) is configured to provide the following DPI capabilities: stateful inspection of N3 GTP-U tunnels; Content inspection of N3 GTP-U tunnels (e.g., to inspect content of inner IP session of N3 GTP-U tunnels); support for 3GPP Technical Specification (TS) 29.274 V15.3.0 Release 15 (e.g., and later releases) for Procedures for the 5G system to support 5G cellular technology; and support for 3GPP Technical Specification (TS) 29.281 V15.4.0 Release 14 (e.g., and later releases) for GTP-U protocol.

FIG. 1A is a block diagram of a 5G wireless network with a security platform for providing 5G multi-access security in mobile networks in accordance with some embodiments. FIG. 1A is an example service provider network environment for a multi-access 5G network architecture that includes a Security Platform 102a and a Security Platform 102b in a Control Plane/signaling Network (e.g., each of the security platforms can be implemented using a firewall (FW)/Next Generation Firewall (NGFW), a network sensor acting on behalf of the firewall, or another device/component that can implement security policies using the disclosed techniques) for providing 5G multi-access security as further described below. As shown, the 5G network can also include Fixed/Wired access as shown at 104, Non-3GPP access such as Wi-Fi Access as shown at 106, 5G Radio Access Network (RAN) access as shown at 108, 4G RAN access as shown at 110, and/or other networks (not shown in FIG. 1A) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) including over a Local Data Network (e.g., enterprise network) 112 and a Data Network (e.g., the Internet) 120 to access various applications, web services, content hosts, etc. and/or other networks. As shown in FIG. 1A, each of the 5G network access mechanisms 104, 106, 108, and 110 are in communication with 5G User Plane Functions 114a, which pass through Security Platform 102a, and 5G User Plane Functions 114a are in communication with 5G User Plane Functions 114b. As shown, 4G RAN 110 and 5G RAN 108 are in communication with 5G Core Control/Signaling Functions 118, which is in communication with 5G User Plane Functions 114b.

Referring to FIG. 1A, network traffic communications are monitored using Security Platforms 102a and 102b. For example, Security Platform 102a can also be in communication with security platform 102b to facilitate the disclosed techniques, such as for providing a correlation between monitored GTP-U tunnel sessions and new HTTP/2 based TCP sessions as further described below. As shown, network traffic communications are monitored/filtered in the 5G network using Security Platforms 102a and 102b (e.g., (virtual) devices/appliances that each include a firewall (FW), a network sensor acting on behalf of the firewall, or another device/component that can implement security policies using the disclosed techniques) configured to perform the disclosed security techniques as further described below. In addition, Security Platforms 102a and/or 102b can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate 5G multi-access security.

Figure 1B:
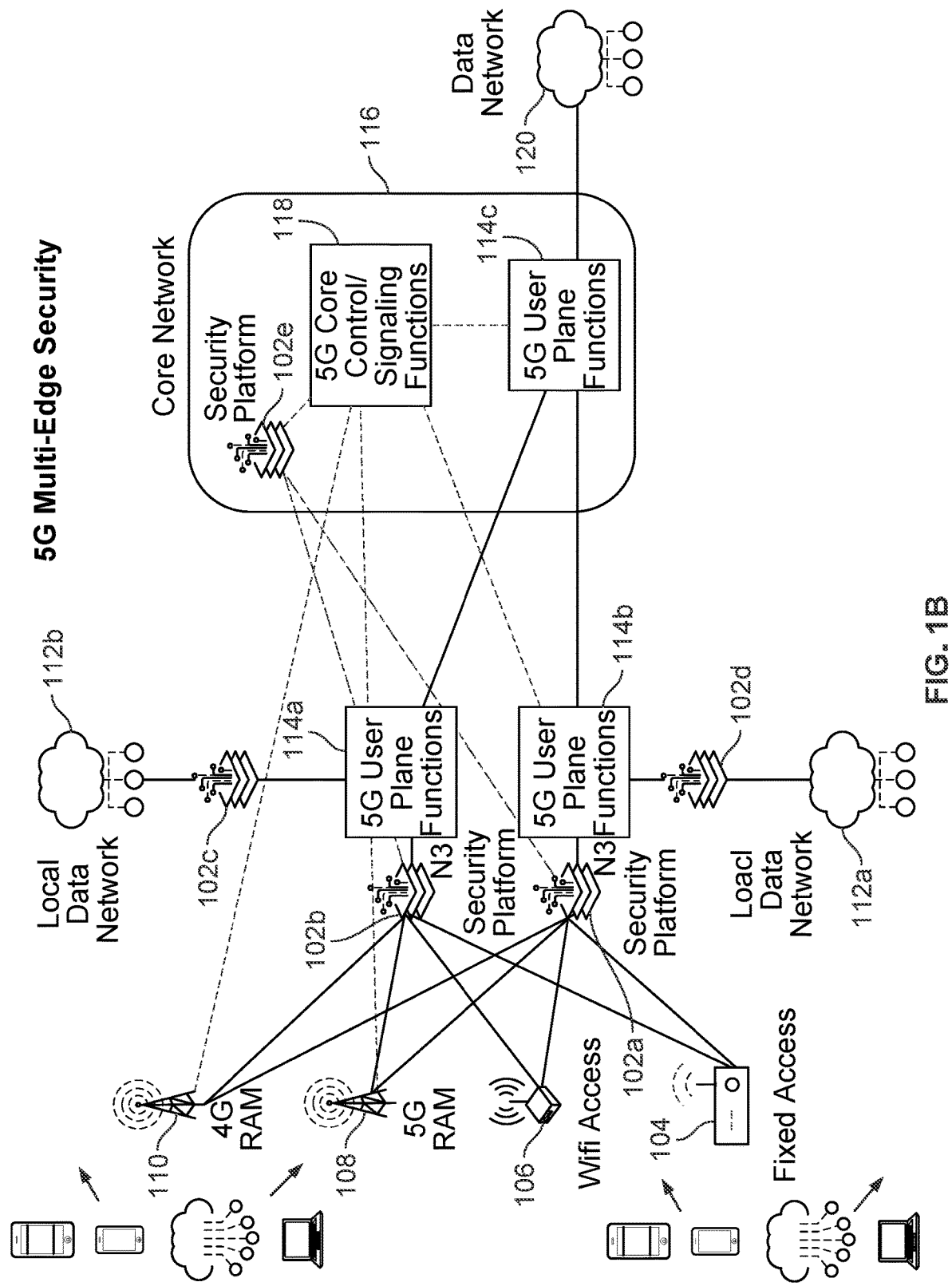
FIG. 1B is a block diagram of a 5G wireless network with a security platform for providing 5G multi-edge security in mobile networks in accordance with some embodiments.

FIG. 1B is a block diagram of a 5G wireless network with a security platform for providing 5G multi-edge security in mobile networks in accordance with some embodiments. FIG. 1B is an example service provider network environment for a multi-edge 5G network architecture that includes Security Platforms in various locations on the edge of the 5G network as shown at 102a, 102b, 102c, and 102d for monitoring communications to 5G User Plane Functions 114a-c and Local Data Networks 112a-b as well as Security Platform 102e for monitoring communications to 5G Core Control/Signaling Functions 118 in Core Network 116 (e.g., each of the security platforms can be implemented using a firewall (FW)/Next Generation Firewall (NGFW), a network sensor acting on behalf of the firewall, or another device/component that can implement security policies using the disclosed techniques) for providing 5G multi-edge security as further described below.

Referring to FIG. 1B, network traffic communications are monitored using Security Platforms 102a-e. For example, Security Platforms 102a and 102b can also be in communication with Security Platform 102e to facilitate the disclosed techniques, such as for providing a correlation between monitored GTP-U tunnel sessions and new HTTP/2 based TCP sessions as further described below. As shown, network traffic communications are monitored/filtered in the 5G network using Security Platforms 102a-e (e.g., (virtual) devices/appliances that each includes a firewall (FW), a network sensor acting on behalf of the firewall, or another device/component that can implement security policies using the disclosed techniques) configured to perform the disclosed security techniques as further described below. As similarly described above with respect to FIG. 1A, one or more of Security Platforms 102a-e can also be in network communication with a Cloud Security Service 122 (not shown in FIG. 1B) (e.g., a commercially available cloud-based security service, such as the WildFire' cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate 5G multi-edge security.

Figure 1C:
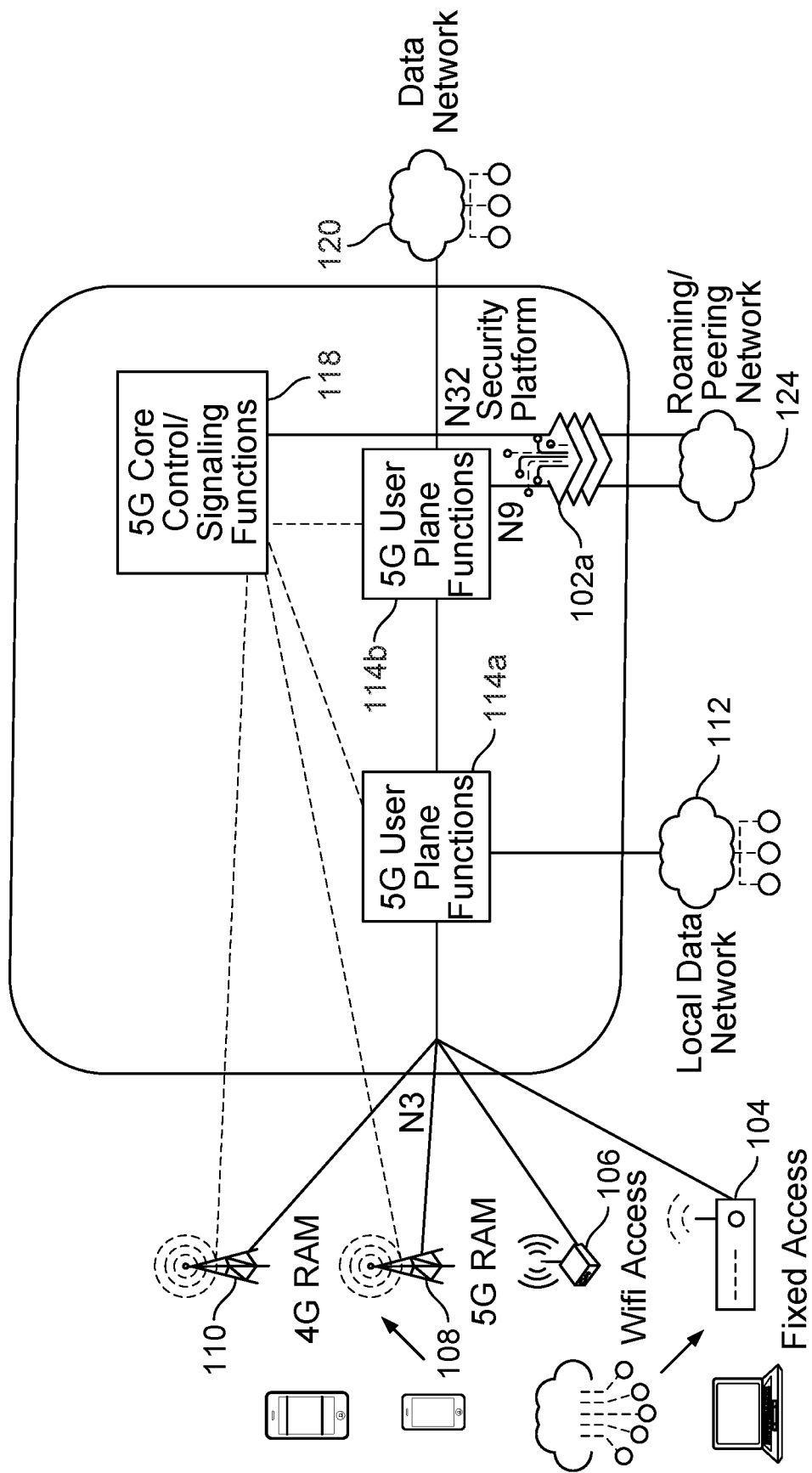
FIG. 1C is a block diagram of a 5G wireless network with a security platform for providing a 5G roaming security—home routed scenario in mobile networks in accordance with some embodiments.

FIG. 1C is a block diagram of a 5G wireless network with a security platform for providing a 5G roaming security—home routed scenario in mobile networks in accordance with some embodiments. FIG. 1C is an example service provider network environment for a roaming 5G network architecture that includes a Security Platform for monitoring communications to 5G User Plane Function 114-b and Roaming/Peering Network 124 as well as for monitoring communications to 5G Core Control/Signaling Functions 118 (e.g., the security platform can be implemented using a firewall (FW)/Next Generation Firewall (NGFW), a network sensor acting on behalf of the firewall, or another device/component that can implement security policies using the disclosed techniques) for providing 5G roaming security as further described below.

Referring to FIG. 1C, network traffic communications are monitored using Security Platform 102a. Specifically, in this roaming security—home routed scenario, a single firewall monitors both control plane (HTTP/2) traffic and user plane (GTP-U) traffic (e.g., the N32 interface carries control plane traffic, and the N9 interface carries GTP-U traffic as shown in FIG. 1C). For example, Security Platform 102a can facilitate the disclosed techniques, such as for providing a correlation between monitored GTP-U tunnel sessions and new HTTP/2 based TCP sessions as further described below. As shown, network traffic communications are monitored/filtered in the 5G network using Security Platform 102a (e.g., (virtual) device/appliance that includes a firewall (FW), a network sensor acting on behalf of the firewall, or another device/component that can implement security policies using the disclosed techniques) configured to perform the disclosed security techniques as further described below. As similarly described above with respect to FIG. 1A, Security Platform 102a can also be in network communication with a Cloud Security Service 122 (not shown in FIG. 1C) (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate 5G roaming security.

Figure 1D:
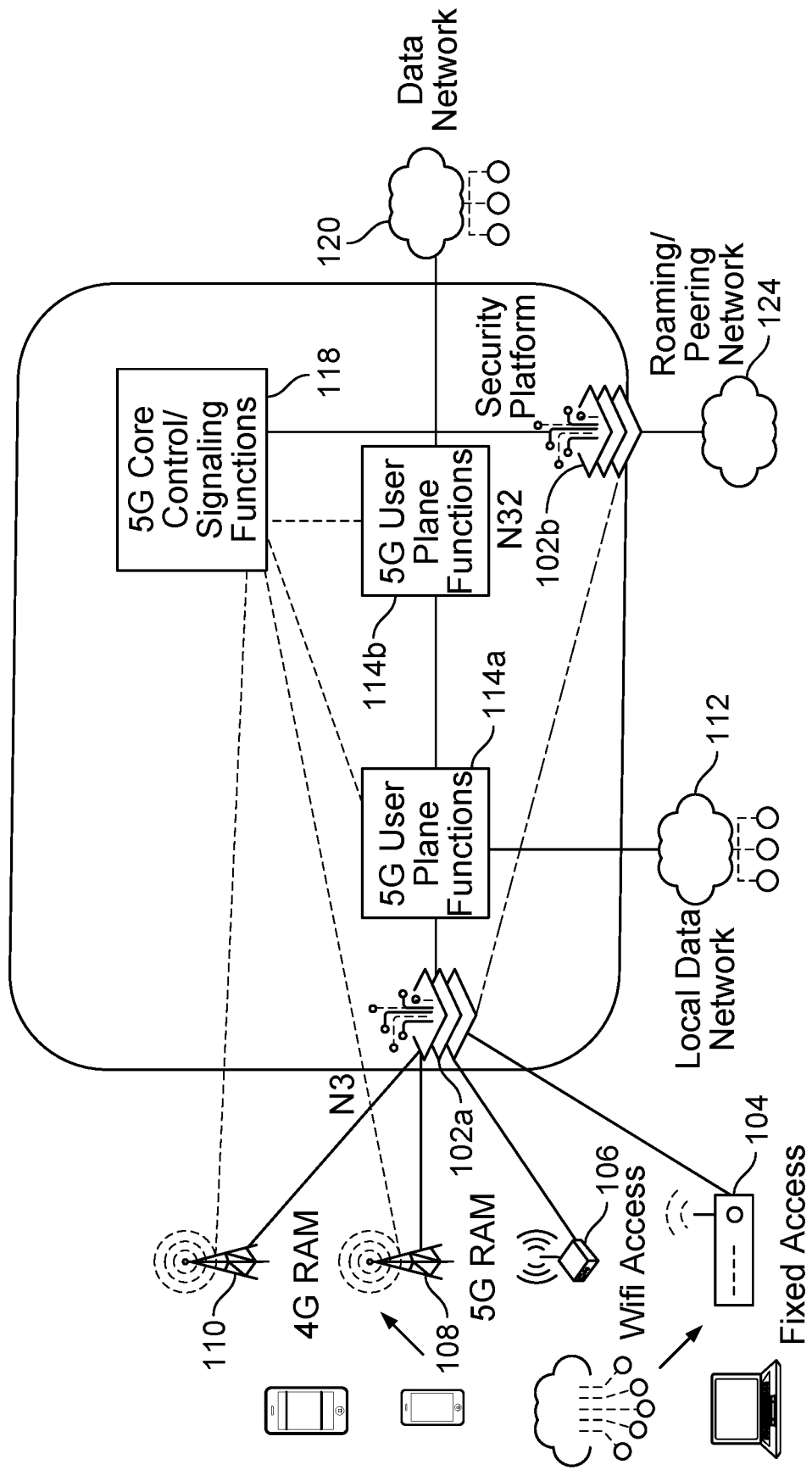
FIG. 1D is a block diagram of a 5G wireless network with security platforms for providing a 5G roaming security—local breakout scenario in mobile networks in accordance with some embodiments.

FIG. 1D is a block diagram of a 5G wireless network with security platforms for providing a 5G roaming security—local breakout scenario in mobile networks in accordance with some embodiments. FIG. 1D is an example service provider network environment for a roaming 5G network architecture that includes Security Platforms in various locations on the edge of the 5G network including Security Platform 102*a* for monitoring communications to 5G User Plane Functions 114*a-b* and Local Data Network 112 and Roaming/Peering Network 124 as well as Security Platform 102*b* for monitoring communications to 5G Core Control/Signaling Functions 118 (e.g., each of the security platforms can be implemented using a firewall (FW)/Next Generation Firewall (NGFW), a network sensor acting on behalf of the firewall, or another device/component that can implement security policies using the disclosed techniques) for providing 5G roaming security as further described below.

Referring to FIG. 1D, network traffic communications are monitored using Security Platforms 102*a* and 102*b*. Specifically, in this roaming security—local breakout scenario, the N32 interface carries control plane traffic, and the N3 interface is the interface between 5G RAN and User Plane functions carrying GTP-U traffic. For example, Security Platform 102*a* can also be in communication with Security Platform 102*b* to facilitate the disclosed techniques, such as for providing a correlation between monitored GTP-U tunnel sessions and new HTTP/2 based TCP sessions as further described below. As shown, network traffic communications are monitored/filtered in the 5G network using Security Platforms 102*a* and 102*b* (e.g., (virtual) devices/appliances that each includes a firewall (FW), a network sensor acting on behalf of the firewall, or another device/component that can implement security policies using the disclosed techniques) configured to perform the disclosed security techniques as further described below. As similarly described above with respect to FIG. 1A, one or more of Security Platforms 102*a* and 102*b* can also be in network communication with a Cloud Security Service 122 (not shown in FIG. 1D) (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate 5G roaming security.

Thus, these and various other example network architectures can utilize the disclosed security techniques for 5G mobile network environments in which one or more security platforms can be provided to perform traffic monitoring and filtering to provide new and enhanced 5G related security techniques for 5G mobile networks for service providers based on signaling and DPI information as further described below. As will now be apparent to one of ordinary skill in the art in view of the disclosed embodiments, one or more security platforms can similarly be provided in various other locations within these network architectures (e.g., an inline, pass-through NGFW, such as shown by Security Platforms as shown in FIGS. 1A-D, and/or implemented as agents or virtual machines (VM) instances, which can be executed on existing devices in the service provider's network, such as entities within the 5G User Plane Functions and/or within the 5G Core Control/Signaling Functions as shown in FIGS. 1A-D) and in various wireless network environments to perform the disclosed security techniques as further described below.

Network Slice-Based Security in 5G Networks

Network slice is a logical network within a Public Land Mobile Network (PLMN), which can provide functionality of a complete network, including Radio Access Network (RAN) functions, core network control plane, and user plane functions. One network can support one or several network slices. Generally, network slicing allows the operator (e.g., service provider of the 5G network) to provide customized networks. For example, there can be different requirements on functionality (e.g., priority, charging, policy control, security, and mobility), differences in performance requirements (e.g., latency, mobility, availability, reliability and data rates), or they can serve only specific users (e.g., MPS users, Public Safety users, corporate customers, roamers, or hosting a Mobile Virtual Network Operator (MVNO)).

Network slice is identified by S-NSSAI (Single Network Slice Selection Assistance Information). In an example 5G standard implementation, S-NSSAI includes a Slice/Service type (SST), 8 bits and Slice Differentiator (SD), and optional information, 24 bits. As further described herein, the network slice information can be monitored and extracted for applying security in 5G networks in accordance with some embodiments.

In some embodiments, network slice-based security is performed using a security platform located in a 5G mobile network by parsing HTTP/2 messages to extract network slice information. In an example implementation, HTTP/2 is used in a service-based interface as specified in 3GPP TS 29.500 V15.1.0 Based on the security platform deployment topology in the 5G network, the network slice information can be extracted from two service operation control messages as follows:

(1) Nsmf_PDUSession_CreateSMContext Request: It is used in a Create SM Context service operation as defined in 3GPP TS 29.502 V 15.3.0 to create an individual SM context, for a given PDU session, in the SMF, or in the V-SMF for HR roaming scenarios.

(2) Nsmf_PDUSession_Create Request: It is used in a Create service operation as defined in 3GPP TS 29.502 V 15.3.0 to create an individual PDU session in the H-SMF for HR roaming scenarios.

Specifically, the Nsmf_PDUSession_CreateSMContext Request is used in the following procedures:

(1) UE requested PDU session establishment procedure in the non-roaming and roaming with local breakout case defined in sub clause 4.3.2 in 3GPP TS 23.502 V15.3.0. Nsmf_PDUSession_CreateSMContext Request is sent from AMF to SMF as further described below with respect to FIG. 2A.

Figure 2A:
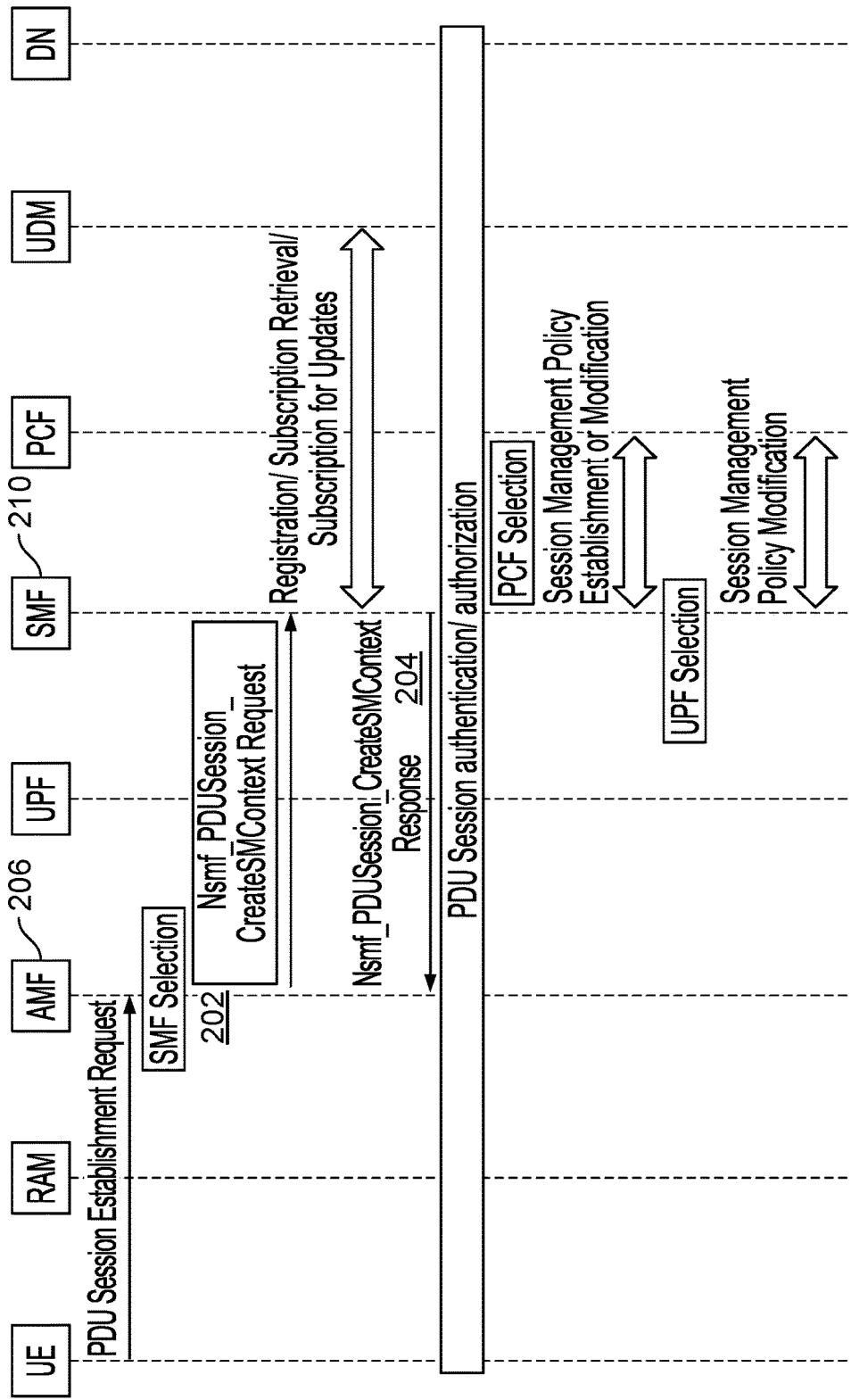
FIG. 2A is an example flow of UE-requested PDU session establishment for non-roaming and roaming with local breakout in a 5G network in accordance with some embodiments.

FIG. 2A is an example flow of UE-requested PDU session establishment for non-roaming and roaming with local breakout in a 5G network in accordance with some embodiments. Referring to FIG. 2A, a first message that is sent from AMF 206 to SMF 210 is an Nsmf_PDUSession_CreateSMContext Request message as shown at 202. The Nsmf_P-

DUSession_CreateSMContext Request message is used in a Create SM Context service operation as defined in 3GPP TS 29.502 V 15.3.0 to create an individual SM context, for a given PDU session, in the SMF, or in the V-SMF for HR roaming scenarios. In response, an Nsmf_PDUSession_CreateSMContext Response message is sent from SMF 210 to AMF 206 as shown at 204.

Figure 2B:
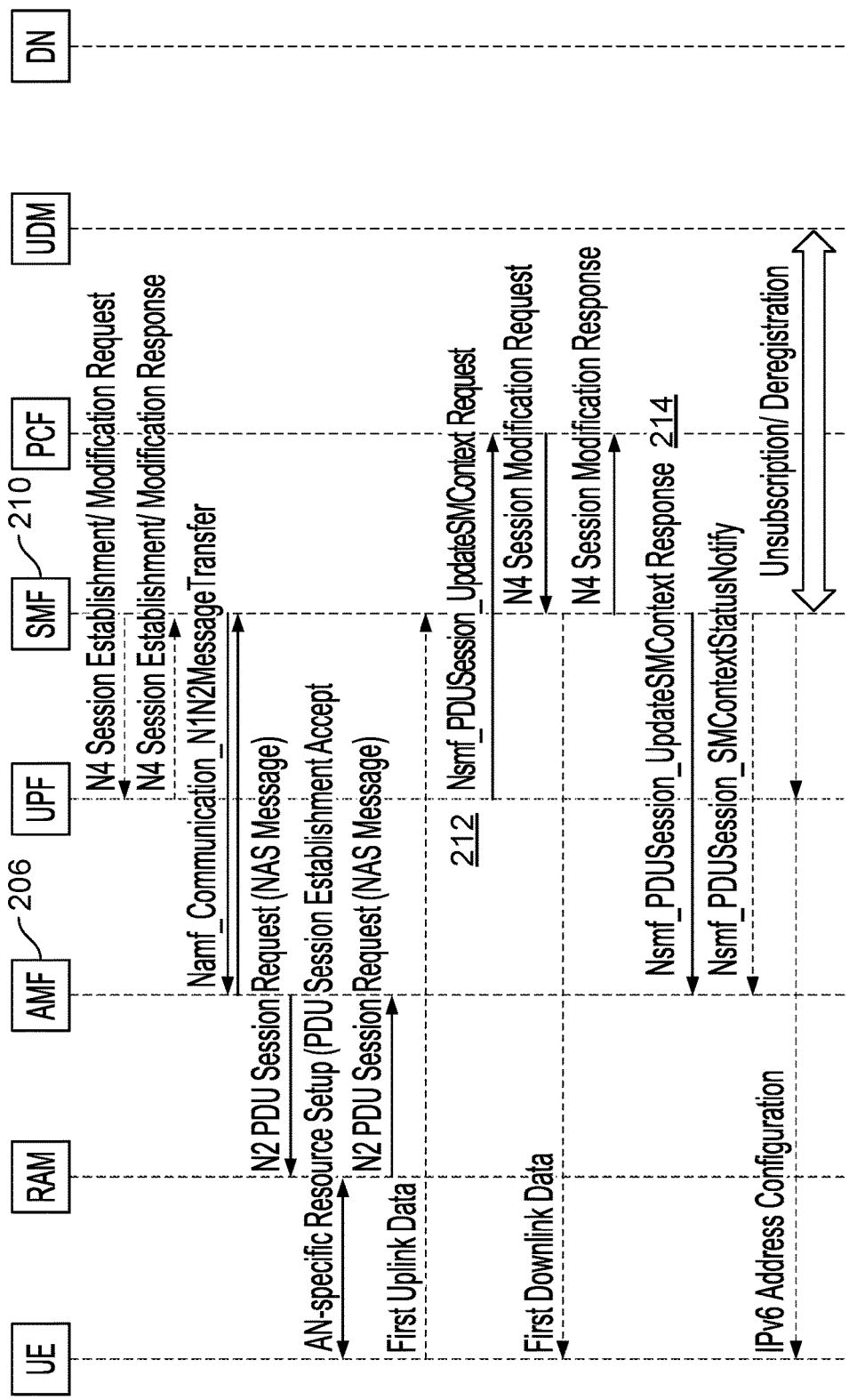
FIG. 2B is an example flow of UE-requested PDU session establishment and modification/update for non-roaming and roaming with local breakout in a 5G network in accordance with some embodiments.

FIG. 2B is an example flow of UE-requested PDU session establishment and modification/update for non-roaming and roaming with local breakout in a 5G network in accordance with some embodiments. Referring to FIG. 2B, an Nsmf_PDUSession_UpdateSMContext Request message is sent from AMF 206 to SMF 210 as shown at 212. In response, an Nsmf_PDUSession_UpdateSMContext Response message is sent from SMF 210 to AMF 206 as shown at 214.

Figure 2C:
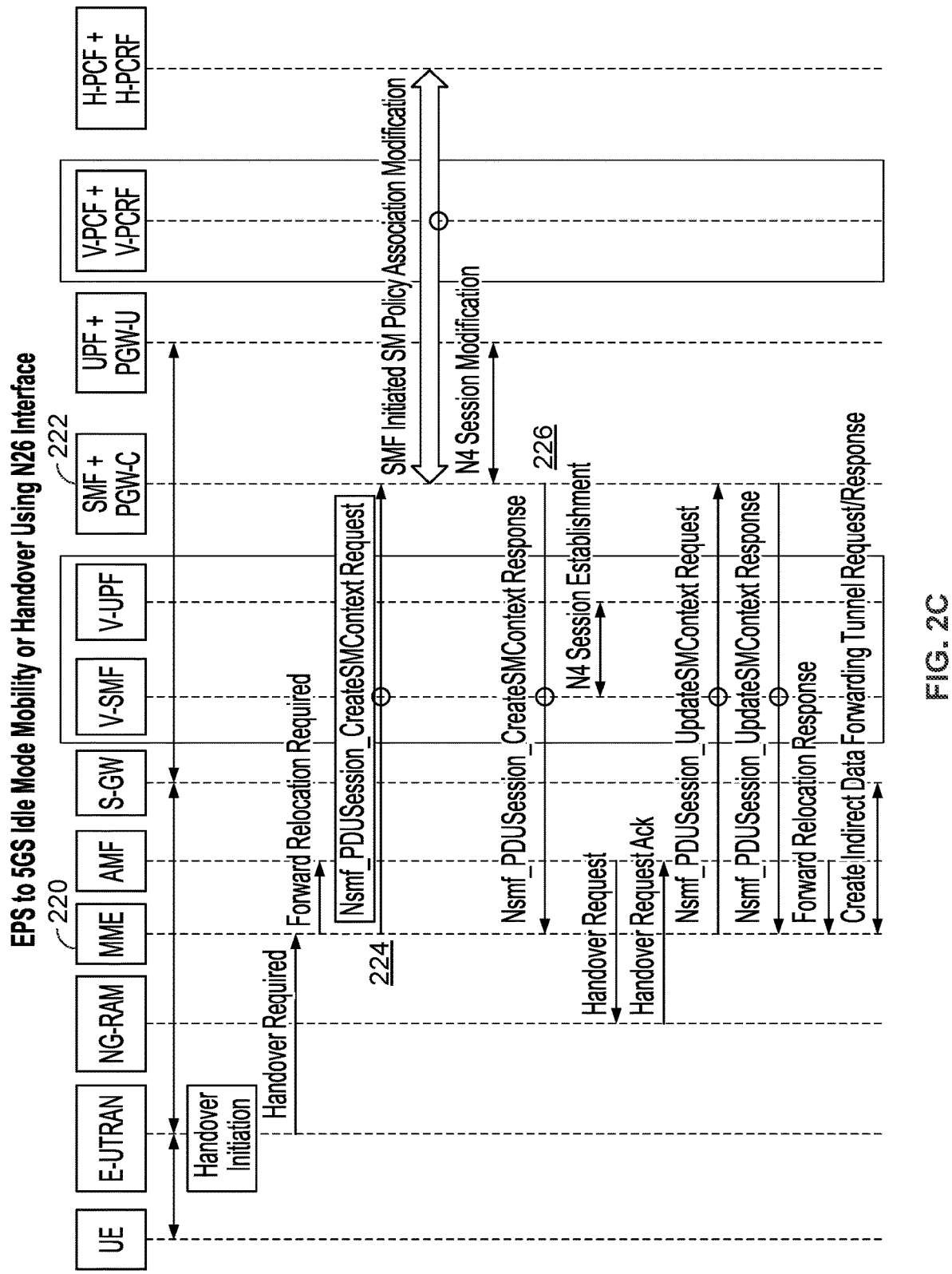
FIG. 2C is an example flow of EPS to 5GS idle mode mobility or handover using the N26 interface in a 5G network in accordance with some embodiments.

FIG. 2C is an example flow of EPS to 5GS idle mode mobility or handover using the N26 interface in a 5G network in accordance with some embodiments. For example, the EPS to 5GS idle mode mobility or handover using the N26 interface case is defined in sub clause 4.11 in 3GPP TS 23.502 V15.2.0. The Nsmf_PDUSession_Create Request is sent from the V-SMF to the H-SMF. The Nsmf_PDUSession_CreateSMContext Request is sent from the AMF to the SMF+PGW-C. The Nsmf_PDUSession_CreateSMContext Request is sent from the AMF to the V-SMF in case of home routed scenario. Referring to FIG. 2C, a first message that is sent from MME 220 to SMF+PGW-C 222 is an Nsmf_PDUSession_CreateSMContext Request message as shown at 224. In response, an Nsmf_PDUSession_CreateSMContext Response message is sent from SMF+PGW-C 222 to MME 220 as shown at 226.

Figure 2D:
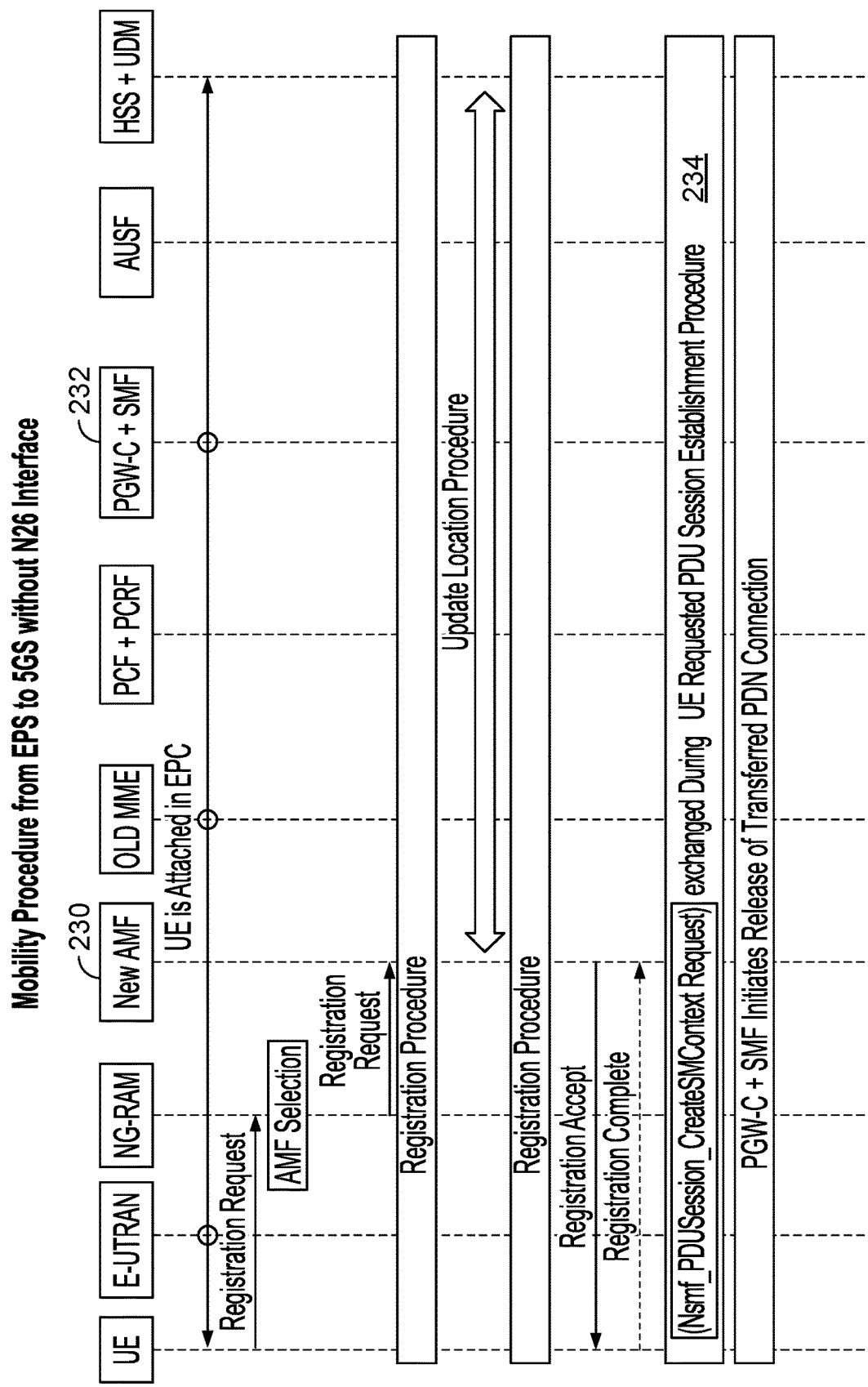
FIG. 2D is an example flow of a mobility procedure from EPS to 5GS without using the N26 interface in a 5G network in accordance with some embodiments.

FIG. 2D is an example flow of a mobility procedure from EPS to 5GS without using the N26 interface in a 5G network in accordance with some embodiments. For example, the EPS to 5GS mobility without N26 interface case defined in sub clause 4.11.2.3 in 3GPP TS 23.502 V15.2.0. The Nsmf_PDUSession_Create Request is sent from the V-SMF to the H-SMF. The Nsmf_PDUSession_CreateSMContext Request is sent from the New AMF 230 to the SMF+PGW-C 232. Referring to FIG. 2D, an Nsmf_PDUSession_CreateSMContext Request message is exchanged during the UE requested PDU Session Establishment Procedure as shown at 234.

Figure 2E:
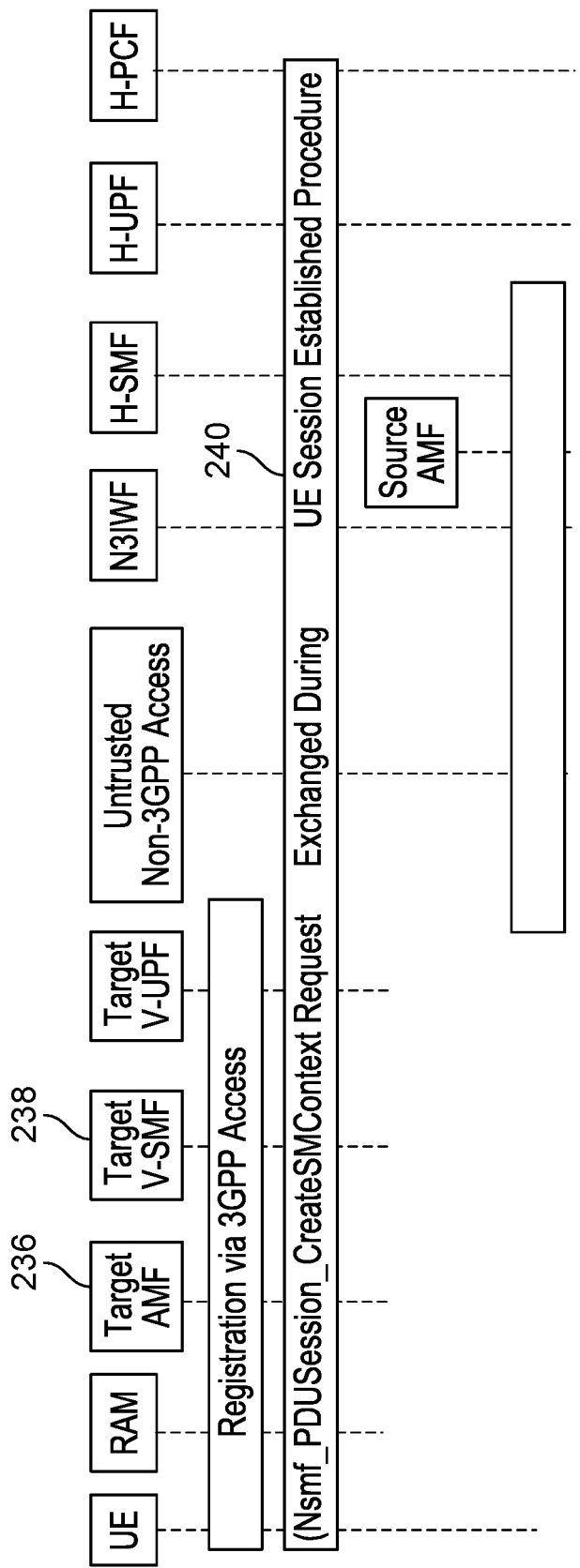
FIG. 2E is an example flow of a handover of a PDU session between 3GPP access and non-3GPP access in which the target AMF does not know the SMF resource identifier of the SM context used by the source AMF in a 5G network in accordance with some embodiments.

FIG. 2E is an example flow of a handover of a PDU session between 3GPP access and non-3GPP access in which the target AMF does not know the SMF resource identifier of the SM context used by the source AMF in a 5G network in accordance with some embodiments. One example is handover of a PDU session between 3GPP access and non-3GPP access in which the target AMF does not know the SMF resource identifier of the SM context used by the source AMF in a 5G network, such as when the target AMF is not in the PLMN of the N3IWF as defined in sub clause 4.9.2.3.2 in 3GPP TS 23.502 V15.2.0. The Nsmf_PDUSession_CreateSMContext Request is sent from the AMF 236 to the V-SMF 238. Referring to FIG. 2E, an Nsmf_PDUSession_CreateSMContext Request message is exchanged during the UE requested UE Session Establishment Procedure as shown at 240.

Figure 2F:
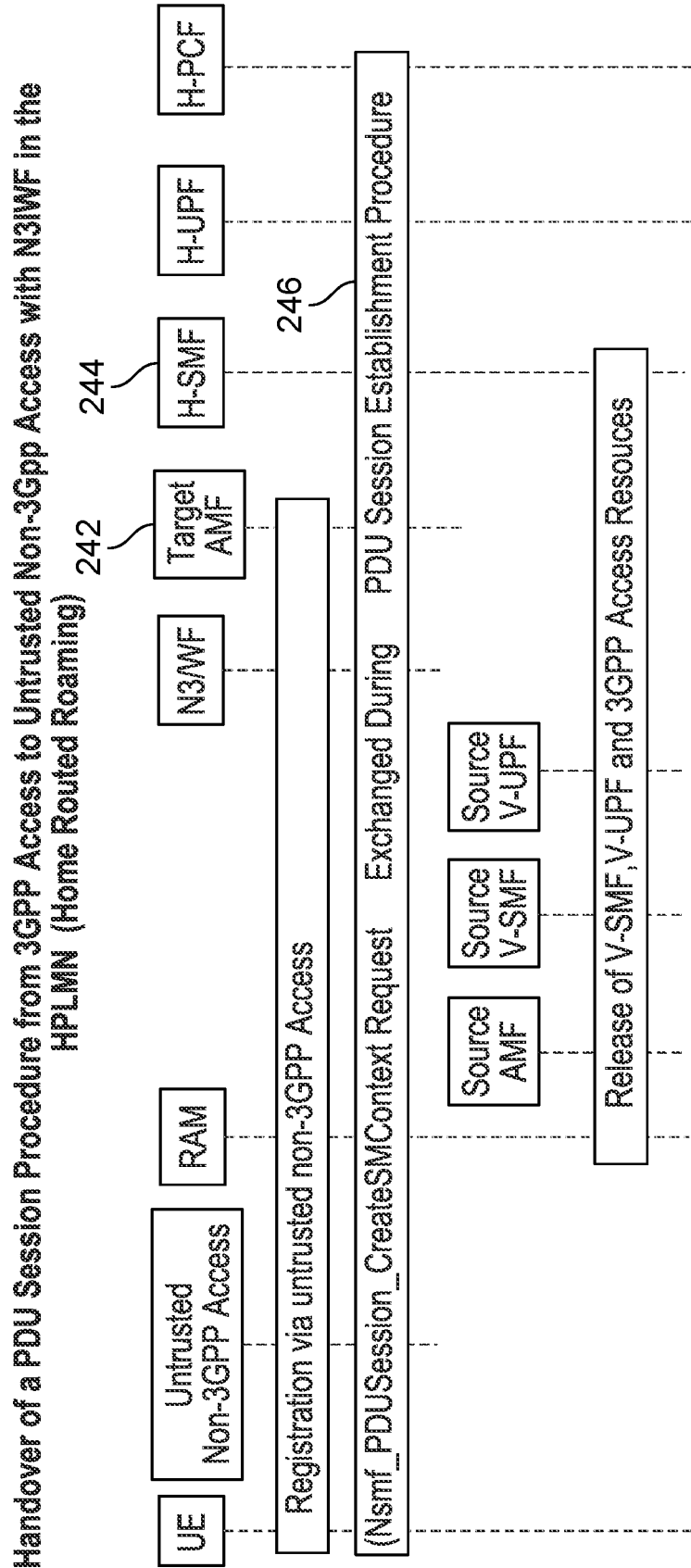
FIG. 2F is an example flow of a handover of a PDU session from 3GPP access to untrusted non-3GPP access with N3IWF in the HPLMN (home routed roaming) in a 5G network in accordance with some embodiments.

FIG. 2F is an example flow of a handover of a PDU session from 3GPP access to untrusted non-3GPP access with N3IWF in the HPLMN (home routed roaming) in a 5G network in accordance with some embodiments. For example, this example addresses a use case scenario of when the UE is roaming and the selected N3IWF is in the HPLMN as defined in sub clause 4.9.2.4.2 of 3GPP TS 23.502. The Nsmf_PDUSession_Create Request is sent from V-SMF to H-SMF. The Nsmf_PDUSession_CreateSMContext Request is sent from the AMF 242 to the H-SMF 244. Referring to FIG. 2F, an Nsmf_PDUSession_CreateSMContext Request message is exchanged during the PDU Session Establishment Procedure as shown at 246.

Figure 2G:
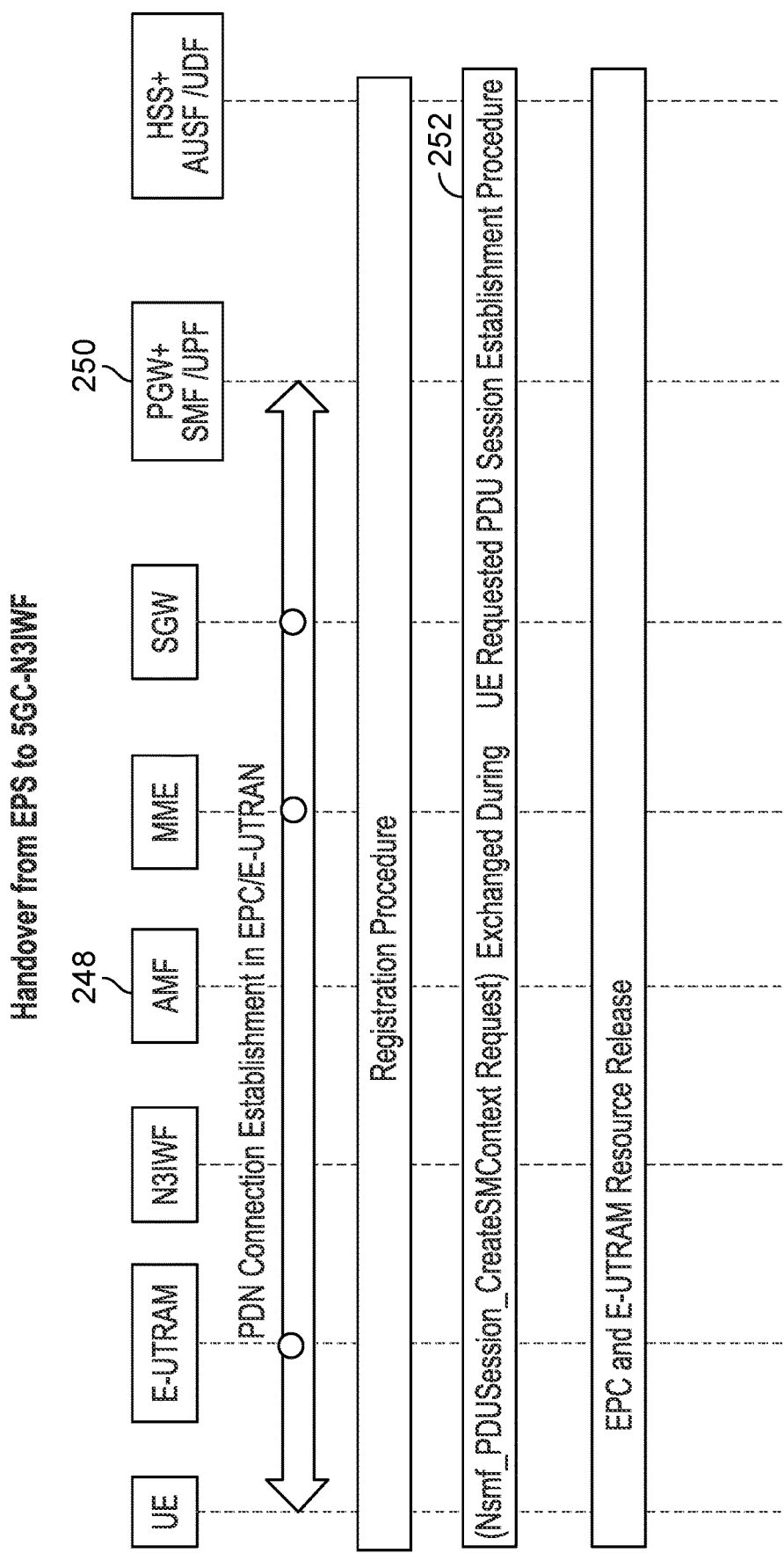
FIG. 2G is an example flow of a handover of an EPS to 5GC-N3IWF in a 5G network in accordance with some embodiments.

FIG. 2G is an example flow of a handover of an EPS to 5GC-N3IWF in a 5G network in accordance with some embodiments. For example, this example addresses a use case scenario of a handover of an EPS to 5GC-N3IWF as defined in sub clause 4.11.3.1 of 3GPP TS 23.502. The Nsmf_PDUSession_CreateSMContext Request is sent from the AMF 248 to the PGW+SMF/UPF 250. Referring to FIG. 2G, an Nsmf_PDUSession_CreateSMContext Request message is exchanged during the PDU Session Establishment Procedure as shown at 252.

Figure 2H:
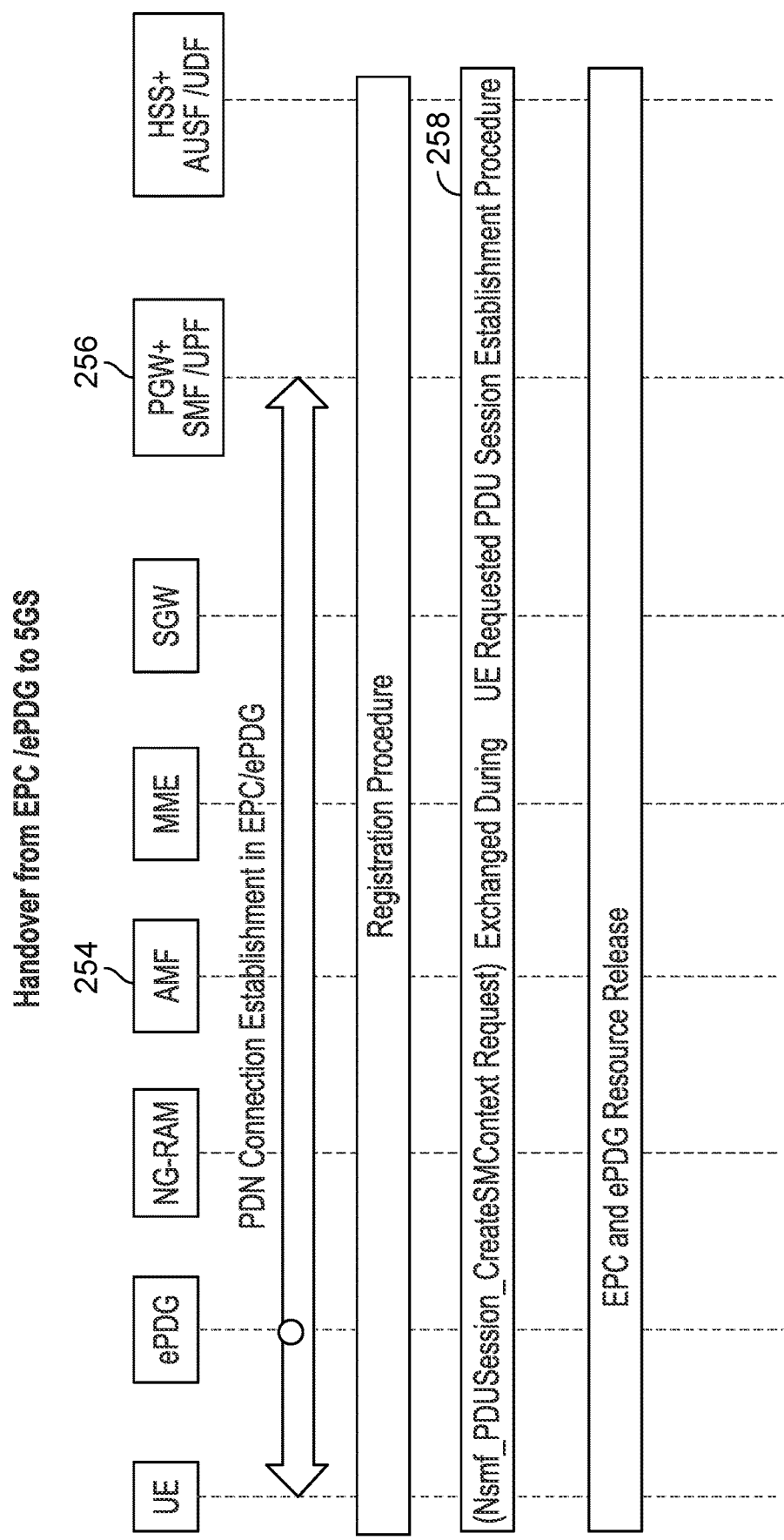
FIG. 2H is an example flow of a handover of an EPC/ePDG to 5GS in a 5G network in accordance with some embodiments.

FIG. 2H is an example flow of a handover of an EPC/ePDG to 5GS in a 5G network in accordance with some embodiments. For example, this example addresses a use case scenario of a handover of an EPC/ePDG to 5GS as defined in sub clause 4.11.4.1 of 3GPP TS 23.502. The Nsmf_PDUSession_CreateSMContext Request is sent from AMF 254 to PGW+SMF/UPF. Referring to FIG. 2H, an Nsmf_PDUSession_CreateSMContext Request message is exchanged during the PDU Session Establishment Procedure as shown at 258.

Figure 2I:
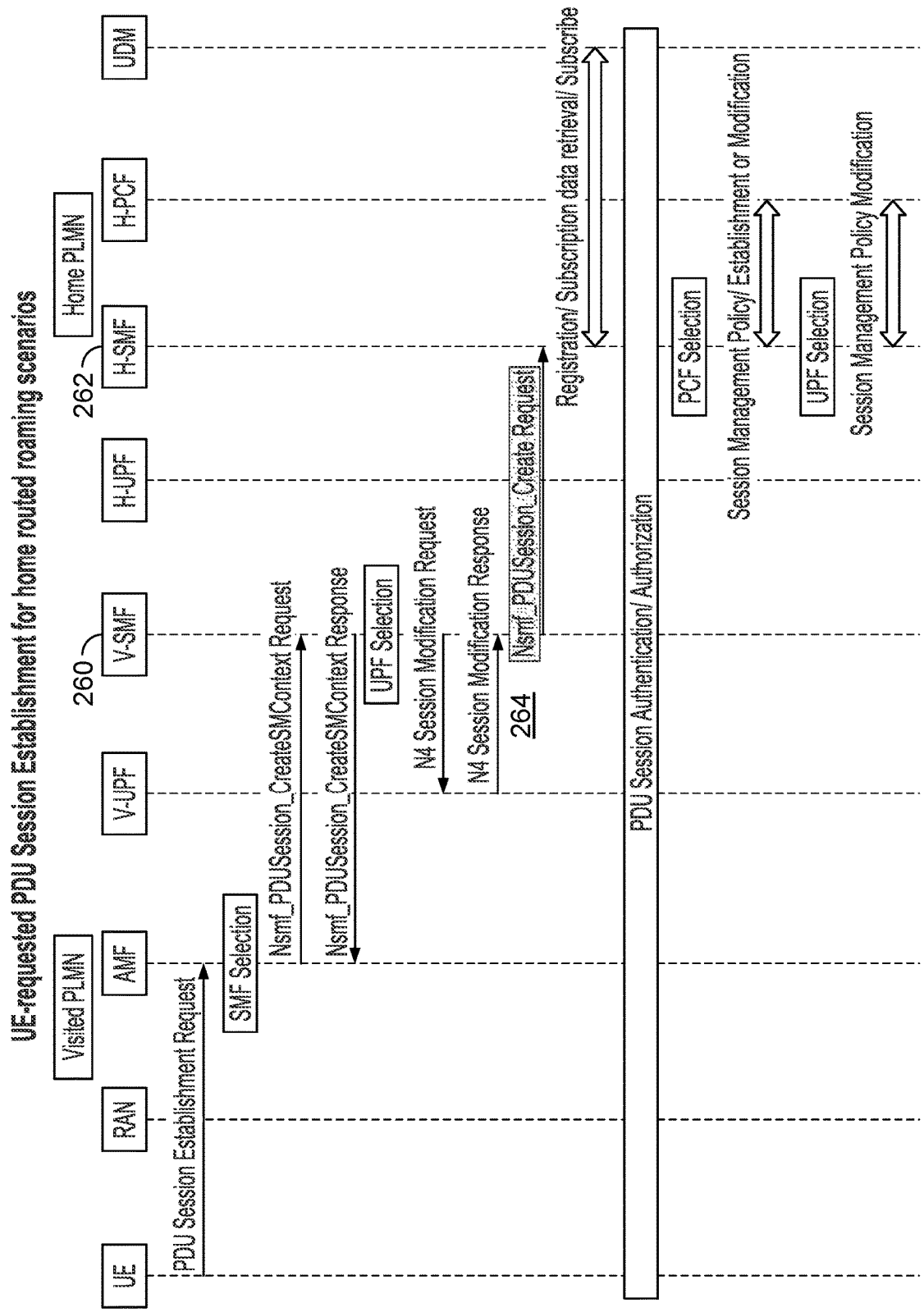
FIG. 2I is an example flow of a UE-requested PDU session establishment for home routed roaming scenarios in a 5G network in accordance with some embodiments.

FIG. 2I is an example flow of a UE-requested PDU session establishment for home routed roaming scenarios in a 5G network in accordance with some embodiments. For example, this example addresses a use case scenario of a UE-requested PDU session establishment as defined in sub clause 4.3.2.2.2 of 3GPP TS 23.502. The Nsmf_PDUSession_Create Request is sent from V-SMF 260 to H-SMF 262. Referring to FIG. 2I, an Nsmf_PDUSession_CreateRequest message is exchanged during the PDU Session Establishment Procedure as shown at 264.

Figure 2J:
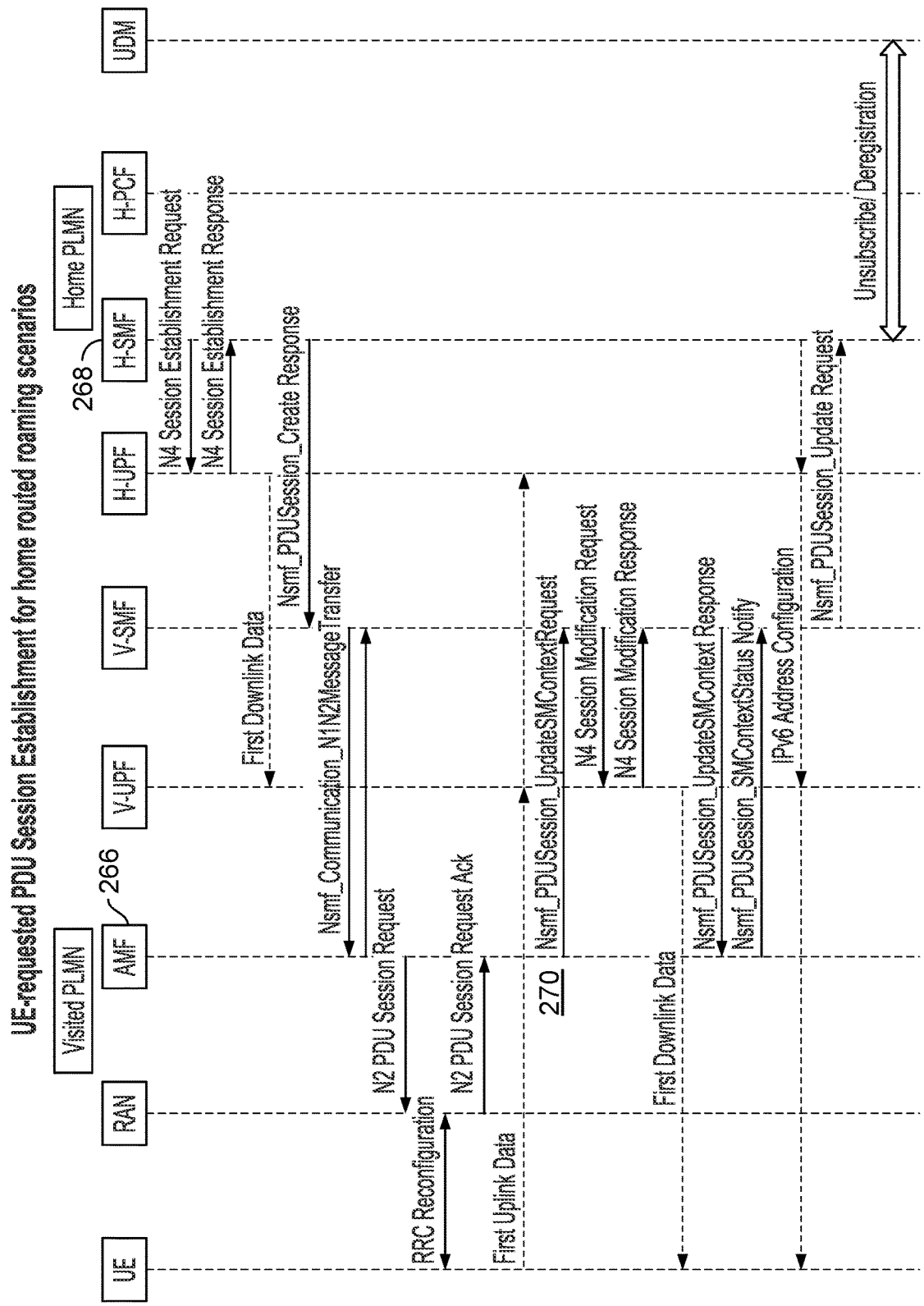
FIG. 2J is an example flow of a UE-requested PDU session establishment and modification/update for home routed roaming scenarios in a 5G network in accordance with some embodiments.

FIG. 2J is an example flow of a UE-requested PDU session establishment and modification/update for home routed roaming scenarios in a 5G network in accordance with some embodiments. Referring to FIG. 2J, an Nsmf_PDUSession_UpdateSMContextRequest message is exchanged during the PDU Session Establishment Procedure as shown in FIG. 2J as shown at 270 between AMF 266 and H-SMF 268.

In one embodiment, the security platform monitors these messages such as described above with respect to FIGS. 2A-2J to extract network slice related information and/or other parameters/information, such as described herein, that is included within these messages based on a security policy (e.g., monitoring Nsmf_PDUSession_CreateSMContext Request and/or other messages using a pass through firewall/NGFW that is located between various entities in the 5G core network or using a firewall/NGFW implemented as VM instances or agents executed on various entities in the 5G core network). For example, the security platform can monitor these messages and extract the Nsmf_PDUSession_CreateSMContext Request message and/or other messages to obtain network slice information (e.g., S-NSSAI, which includes a Slice/Service type (SST), 8 bits and Slice Differentiator (SD), and optional information, 24 bits), such as further described below.

In one embodiment, the disclosed techniques perform inspection of signaling/control traffic in service provider networks, such as HTTP/2 traffic, and inspection of tunneled user traffic (e.g., including the N3 GTP-U tunnel between the RAN and UPF, or N9 GTP-U tunnel between UPF's) in service provider networks, such as GTP-U traffic (e.g., using a security platform, such as implemented using an NGFW that is capable of performing DPI to identify an APP ID, a user ID, a content ID, perform URL filtering, and/or other firewall/security policies for security/threat detection/prevention). In one embodiment, the disclosed techniques perform inspection of signaling/control traffic in service provider networks, such as HTTP/2 traffic, to extract information exchanged in the HTTP/2 traffic (e.g., parameters, such as Network Slice information, Data Network Name (DNN), Subscription Permanent Identifier (SUPI), Permanent Equipment Identifier (PEI), General Public Subscription Identifier (GPSI), and User Location information, such as further described below). In one embodiment, the disclosed techniques perform inspection of signaling/control traffic in service provider networks, such as HTTP/2 traffic, to extract information exchanged in the HTTP/2 traffic (e.g., parameters, such as described above and further described below) as well as to monitor tunneled user traffic in service provider networks (e.g., using DPI, such as described above and further described below) for use in applying a security policy based on this extracted information and/or in combination with DPI, such as further described below.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Service-Based Security Per Data Network Name in 5G Networks

Techniques for service-based security per Data Network Name are also disclosed in accordance with some embodiments. In 5G networks, the Data Network Name (DNN) is generally equivalent to an Access Point Name (APN) (e.g., APN is a reference to a PGW/GGSN and it identifies the form of access to another network, such as the Internet, and is composed of two parts: (1) APN Network Identifier (mandatory); and (2) APN Operator Identifier (optional)) as defined in TS 23.003 V15.3.0. Both identifiers have an equivalent meaning and carry the same information. The DNN may be used, for example, to: (1) select an SMF and UPF(s) for a PDU Session; (2) select an interface (N6) to Data Network for a PDU Session; and/or (3) determine policies to apply to this PDU Session.

In some embodiments, service-based security per Data Network Name (DNN) is applied using a security platform in 5G networks by parsing HTTP/2 messages to extract DNN information.

As similarly described above, based on the security platform deployment topology in the 5G network, the Network Slice information can be extracted from two service operation control messages: (1) Nsmf_PDUSession_CreateSMContext Request; and (2) Nsmf_PDUSession_Create Request.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Service-Based Security Per Subscription Permanent Identifier in 5G Networks

Techniques for service-based security per Subscription Permanent Identifier are also disclosed in accordance with some embodiments. In 5G networks, the Subscription Permanent Identifier (SUPI) is a globally unique 5G subscription identifier allocated to each subscriber in the 5G system. It is only inside the 3GPP system and defined in sub clause 5.9.2 of 3GPP TS 23.501 V15.3.0.

For example, the SUPI may include the following: (1) an IMSI (e.g., IMSI is a unique 15 digit number allocated to each mobile subscriber in the GSM/UMTS/EPS system) as defined in 3GPP TS 23.003 V15.3.0; and (2) Network-Specific Identifier (e.g., NAI is the user identity submitted by the client during network access authentication. In roaming, the purpose of the NAI is to identify the user as well as to assist in the routing of the authentication request), used for private networks as defined in 3GPP TS 23.003 V15.3.0.

In some embodiments, service-based security per Subscription Permanent Identifier (SUPI) is applied using a security platform in 5G networks by parsing HTTP/2 messages to extract SUPI information.

As similarly described above, based on the security platform deployment topology in the 5G network, the Network Slice information can be extracted from two service operation control messages: (1) Nsmf_PDUSession_CreateSMContext Request; and (2) Nsmf_PDUSession_Create Request.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Service-Based Security Per Permanent Equipment Identifier in 5G Networks

Techniques for service-based security per Permanent Equipment Identifier are also disclosed in accordance with some embodiments. In 5G networks, the Permanent Equipment Identifier (PEI) is defined for the 3GPP UE accessing the 5G System. The PEI can assume different formats for different UE types and use cases.

For example, if the UE supports at least one 3GPP access technology, the UE must be allocated a PEI in the IMEI format (e.g., IMEI is a unique 15 or 16 digit number allocated to each mobile station equipment). As per the latest release standards, the only formats supported for the PEI parameter are IMEI and IMEISV, as defined in TS 23.003 V15.3.0.

In some embodiments, service-based security per Permanent Equipment Identifier (PEI) is applied using a security platform in 5G networks by parsing HTTP/2 messages to extract PEI information.

As similarly described above, based on the security platform deployment topology in the 5G network, the PEI information can be extracted from two service operation control messages: (1) Nsmf_PDUSession_CreateSMContext Request; and (2) Nsmf_PDUSession_Create Request.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Service-Based Security Per General Public Subscription Identifier in 5G Networks Techniques for service-based security per General Public Subscription Identifier are also disclosed in accordance with some embodiments. Generally, the General Public Subscription Identifier (GPSI) is a public identifier used both inside and outside of the 3GPP system.

For example, the GPSI is used for addressing a 3GPP subscription in different data networks outside of the 3GPP system. Specifically, the GPSI is either an MSISDN (e.g., MS international ISDN numbers are allocated from the ITU-T Recommendation E.164 numbering plan, which includes a Country Code (CC) of the country in which the Mobile Station is registered, followed by: National (significant) mobile number, which includes a National Destination Code (NDC) and Subscriber Number (SN)) or an External Identifier, as specified in 3GPP TS 23.003 V15.3.0.

In some embodiments, service-based security per General Public Subscription Identifier (GPSI) is applied using a security platform in 5G networks by parsing HTTP/2 messages to extract GPSI information.

As similarly described above, based on the security platform deployment topology in the 5G network, the GPSI information can be extracted from two service operation control messages: (1) Nsmf_PDUSession_CreateSMContext Request; and (2) Nsmf_PDUSession_Create Request.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Service-Based Security Per User Location in 5G Networks

Techniques for service-based security per User Location are also disclosed in accordance with some embodiments.

In some embodiments, service-based security per User Location is applied using a security platform in 5G networks by parsing HTTP/2 messages to extract User Location information.

As similarly described above, based on the security platform deployment topology in the 5G network, the User Location information can be extracted from two service operation control messages: (1) Nsmf_PDUSession_CreateSMContext Request; and (2) Nsmf_PDUSession_Create Request.

These and other techniques for providing enhanced security in 5G networks for service providers based on Network Slice information, Data Network Name (DNN), Subscription Permanent Identifier (SUPI), Permanent Equipment Identifier (PEI), General Public Subscription Identifier (GPSI), and User Location information (e.g., and/or in combination with other DPI and/or NGFW techniques, such as Application-ID, user ID, content ID, URL filtering, etc.) will be further described below.

Example Use Cases of Enhanced Security for 5G Networks for Service Providers

The disclosed techniques for providing enhanced security for 5G mobile/service provider networks using a security platform for security policy enforcement can be applied in a variety of additional example use case scenarios for facilitating enhanced and more flexible and dynamic security for 5G mobile/service provider network environments. Additional example use case scenarios will be further described below.

As a first example use case scenario, assume that mobile and converged network operators are offering wireless IoT technologies (e.g., CIoT devices) including Narrowband IoT (NB-IoT) to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this creates an opportunity for mobile and converged network operators to offer network-based security services to these customers that can be provided using the disclosed techniques for enhanced security for CIoT in mobile/service provider networks using a security platform for security policy enforcement (e.g., using inspection and security capabilities on an N3 and interface as described herein).

As a second example use case scenario, assume that mobile and converged network operators are offering wireless IoT technologies (e.g., CIoT devices) including Narrowband IoT (NB-IoT) to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this can lead to CIoT device initiated attacks on the mobile network to which they are connected. As similarly described herein, the disclosed techniques for enhanced security for CIoT in mobile/service provider networks using a security platform for security policy enforcement including inspection and security capabilities on an S11-U interface can be performed to protect the critical network elements of mobile networks from attacking CIoT devices.

Examples of IoT Threats

Example router vulnerabilities include the following: (1) TP-Link Remote Command Execution Vulnerability; (2) ZyXEL/Billion/TrueOnline Routers Remote Code Execution Vulnerability; (3) Netgear WNR2000 Remote Code Execution Vulnerability; (4) MikroTik RouterOS Authentication Bypass Vulnerability; and (5) Netis/Netcore Router Default Credential Remote Code Execution Vulnerability. Camera vulnerabilities include the Sony IPELA ENGINE IP Cameras Backdoor Vulnerability, and Axis Camera Remote Command. Execution Vulnerability. The above-described techniques for applying DNN and Application-ID based security enforcement in service provider networks can be performed to respond to such example router vulnerabilities. As an example, for one DNN, a mobile operator can define an action block (e.g., to drop and log) for all router related remote code execution vulnerabilities. For another DNN, the mobile operator can choose to define an action alert (e.g., to allow and log) for all router related remote code execution vulnerabilities.

Mirai (malware) botnet attack is an example botnet attack that primarily targets online consumer devices, such as IP cameras and home routers. As an example for one DNN, a mobile operator can define an action block (e.g., to drop and log) for all Mirai Command and Control traffic using anti-spyware signatures Threat ID: 13999 and 13974 https://threatvault.paloaltonetworks.com/. For another APN, the mobile operator can choose to define an action alert (e.g., to allow and log) for all Mirai Command and Control traffic.

As will now be apparent in view of the disclosed embodiments, a network service provider/mobile operator (e.g., a cellular service provider entity), a device manufacturer (e.g., an automobile entity, CIoT device entity, and/or other device manufacturer), and/or system integrators can specify such security policies that can be enforced by a security platform using the disclosed techniques to solve these and other technical network security challenges.

Figure 3:
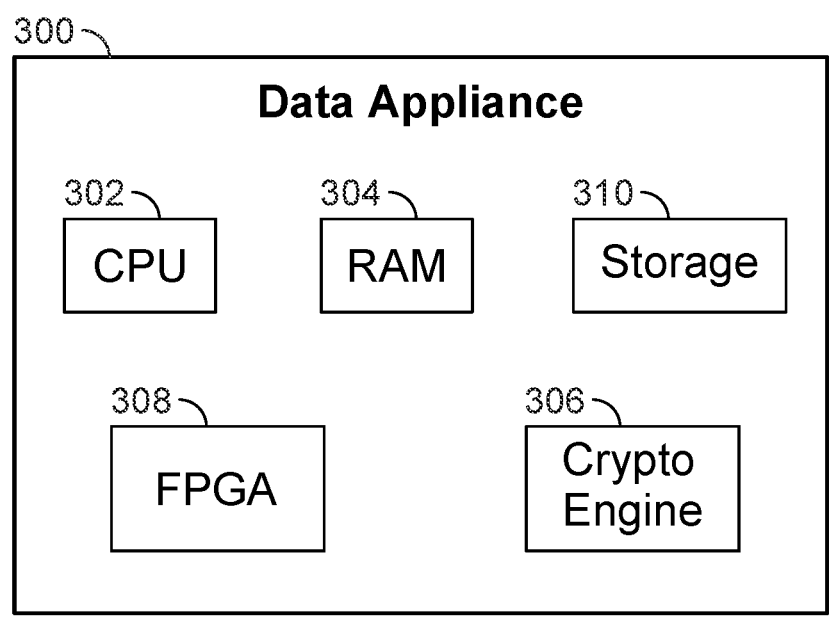
FIG. 3 is a functional diagram of hardware components of a network device for performing enhanced security for 5G mobile networks for service providers in accordance with some embodiments.

Example Hardware Components of a Network Device for Performing Enhanced Security for 5G Mobile Networks for Service Providers FIG. 3 is a functional diagram of hardware components of a network device for performing enhanced security for 5G mobile networks for service providers in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores Network Slice information, Data Network Name (DNN), Subscription Permanent Identifier (SUPI), Permanent Equipment Identifier (PEI), General Public Subscription Identifier (GPSI), and User Location information, and associated IP addresses and possibly other information (e.g., Application-ID, Content-ID, User-ID, URL, and/or other information) that are monitored for implementing the disclosed security policy enforcement techniques using a security platform/firewall device. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
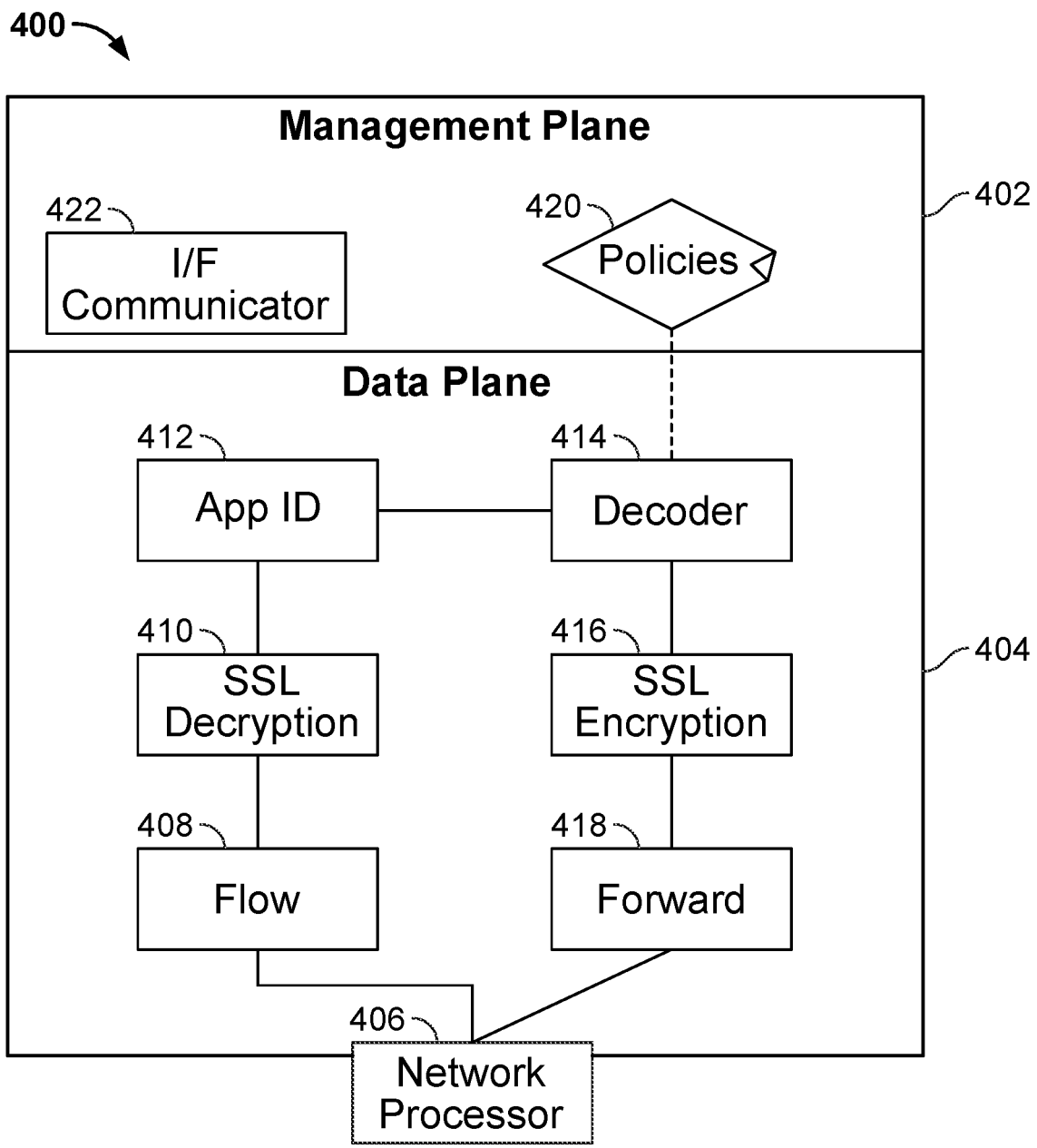
FIG. 4 is a functional diagram of logical components of a network device for performing enhanced security for 5G mobile networks for service providers in accordance with some embodiments.

Example Logical Components of a Network Device for Performing Enhanced Security for 5G Mobile Networks for Service Providers FIG. 4 is a functional diagram of logical components of a network device for performing enhanced security for 5G mobile networks for service providers in accordance with some embodiments. The example shown is a representation of logical components that can be included in network device 400 (e.g., a data appliance, which can implement the disclosed security platform and perform the disclosed techniques). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an IoT device such as a CIoT device, or another resource) using an encrypted session protocol, such as SSL. Network processor 406 is configured to monitor packets from the mobile device, and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves and to identify a user associated with the traffic flow (e.g., to identify an Application-ID as described herein). For example, APP ID 412 can recognize a GET request in the received data and conclude that the session requires an HTTP decoder 414. As another example, APP ID 412 can recognize a GTP-U message and conclude that the session requires a GTP decoder. For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information. Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored HTTP/2 messages and/or DPI of monitored GTP-U traffic as disclosed herein) is applied as described herein with respect to various embodiments based on the monitored, decrypted, identified, and decoded session traffic flows.

As also shown in FIG. 4, an interface (I/F) communicator 422 is also provided for security platform manager communications (e.g., via (REST) APIs, messages, or network protocol communications or other communication mechanisms). In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, service-based interfaces such as Nsmf, Nnef and reference point interfaces such as N3, N9, and/or other interfaces where wired and wireless network traffic flow exists as similarly described herein). As such, network device 400 including I/F communicator 422 can be used to implement the disclosed techniques for security policy enforcement on mobile/service provider network environments as described above and as will be further described below.

Additional example processes for the disclosed techniques for performing enhanced security for CIoT on mobile/service provider network environments will now be described.

Example Processes for Enhanced Security for 5G Networks for Service Providers

Figure 5:
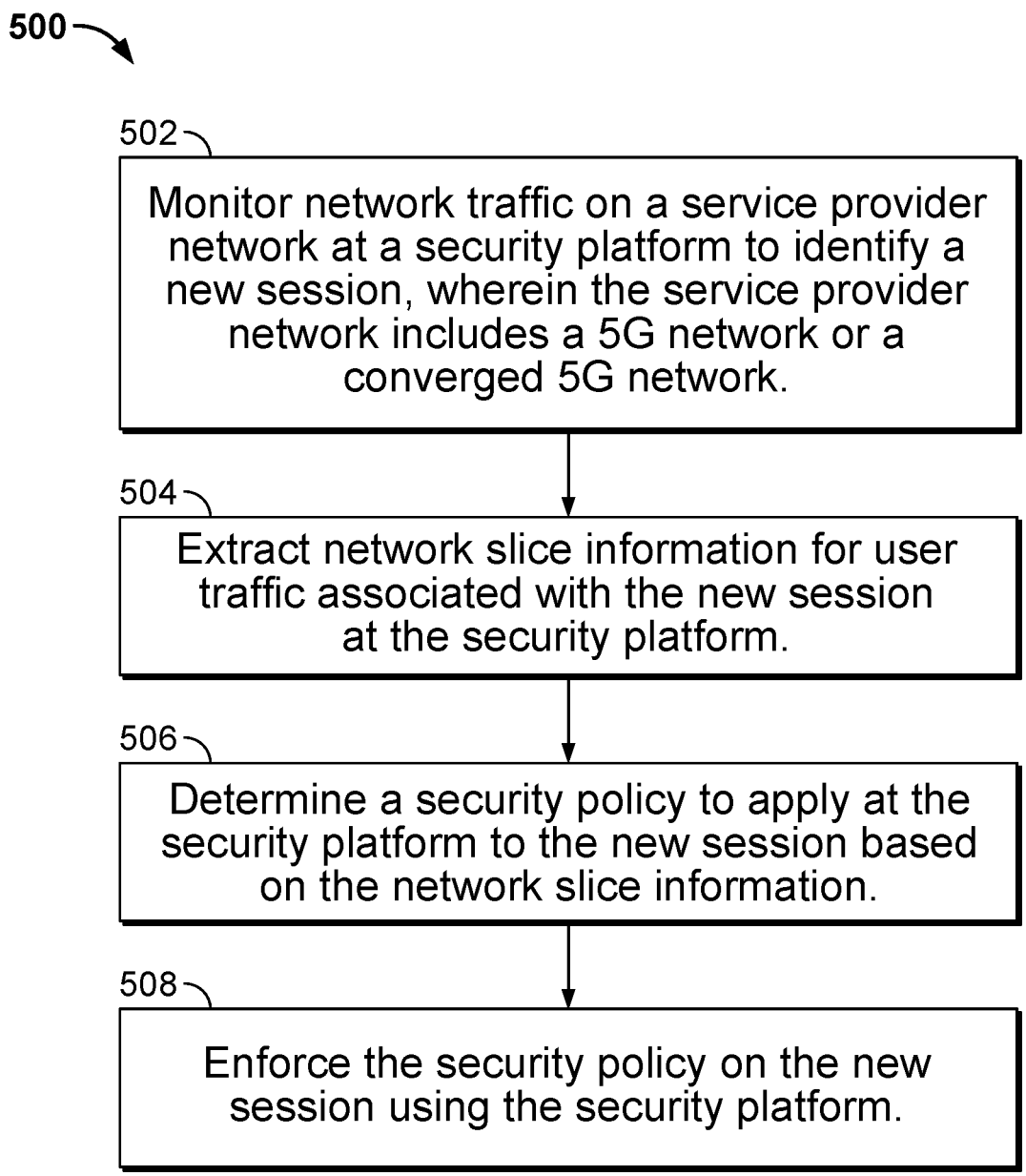
FIG. 5 is a flow diagram of a process for performing enhanced security for 5G networks for service providers in accordance with some embodiments.

FIG. 5 is a flow diagram of a process for performing enhanced security for 5G networks for service providers in accordance with some embodiments. In some embodiments, a process 500 as shown in FIG. 5 is performed by the security platform and techniques as similarly described above including the embodiments described above with respect to FIGS. 1A-4. In one embodiment, process 500 is performed by data appliance 300 as described above with respect to FIG. 3, network device 400 as described above with respect to FIG. 4, a virtual appliance, an SDN security solution, a cloud security service, and/or combinations or hybrid implementations of the aforementioned as described herein.

The process begins at 502. At 502, monitoring network traffic on a service provider network at a security platform to identify a new session, wherein the service provider network includes a 5G network or a converged 5G network, is performed. For example, the security platform (e.g., a firewall, a network sensor acting on behalf of the firewall, or another device/component that can implement security policies) can monitor GTP-U and HTTP/2 traffic on the mobile core network as similarly described above.

At 504, extracting network slice information for user traffic associated with the new session at the security platform is performed. For example, the security platform can parse HTTP/2 messages to extract the network slice information, in which the network slice is identified by Single Network Slice Selection Assistance Information (S-NSSAI), using DPI-based firewall techniques as similarly described above.

At 506, determining a security policy to apply at the security platform to the new session based on the network slice information is performed. For example, the security policy can be determined and/or enforced based on various combinations of Network Slice information, Data Network Name (DNN), Subscription Permanent Identifier (SUPI), Permanent Equipment Identifier (PEI), General Public Subscription Identifier (GPSI), and User Location information, such as similarly described above (e.g., and/or in combination with other DPI-based firewall techniques, such as Application-ID, user ID, content ID, URL filtering, etc.).

At 508, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 6:
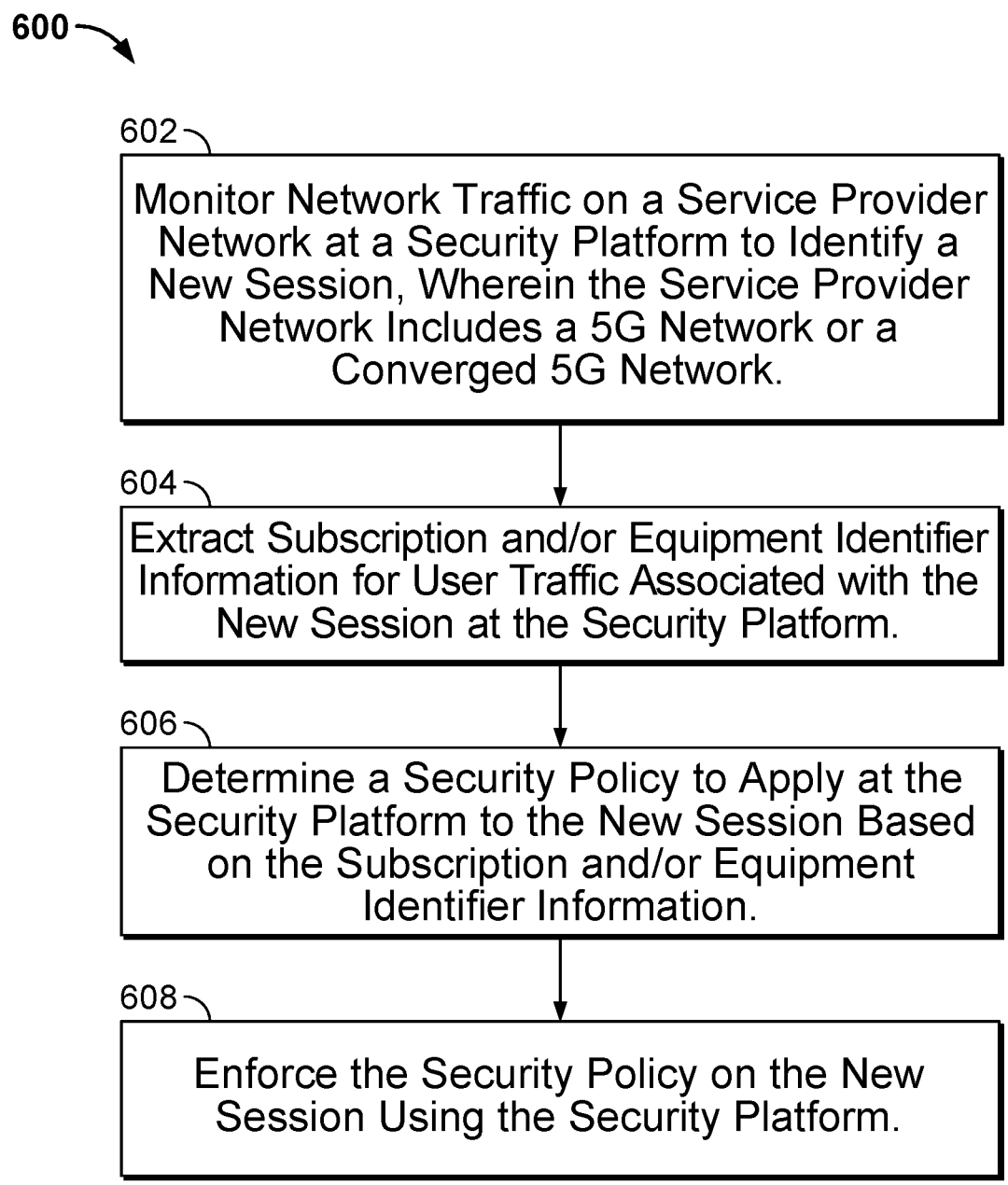
FIG. 6 is another flow diagram of a process for performing enhanced security for 5G networks for service providers in accordance with some embodiments.

FIG. 6 is another flow diagram of a process for performing enhanced security for 5G networks for service providers in accordance with some embodiments. In some embodiments, a process 600 as shown in FIG. 6 is performed by the security platform and techniques as similarly described above including the embodiments described above with respect to FIGS. 1A-4. In one embodiment, process 600 is performed by data appliance 300 as described above with respect to FIG. 3, network device 400 as described above with respect to FIG. 4, a virtual appliance, an SDN security solution, a cloud security service, and/or combinations or hybrid implementations of the aforementioned as described herein.

The process begins at 602. At 602, monitoring network traffic on a service provider network at a security platform to identify a new session, wherein the service provider network includes a 5G network or a converged 5G network, is performed. For example, the security platform (e.g., a firewall, a network sensor acting on behalf of the firewall, or another device/component that can implement security policies) can monitor GTP-U and HTTP/2 traffic on the mobile core network as similarly described above.

At 604, extracting subscription and/or equipment identifier information for user traffic associated with the new session at the security platform is performed. For example, the security platform can parse HTTP/2 messages to extract the subscription and/or equipment identifier information, in which the subscription and/or equipment identifier is identified by a Subscription Permanent Identifier (SUPI), a General Public Subscription Identifier (GPSI), and/or a Permanent Equipment Identifier (PEI), using DPI-based firewall techniques as similarly described above.

At 606, determining a security policy to apply at the security platform to the new session based on the subscription and/or equipment identifier information is performed. For example, the security policy can be determined and/or enforced based on various combinations of Network Slice information, Data Network Name (DNN), Subscription Permanent Identifier (SUPI), Permanent Equipment Identifier (PEI), General Public Subscription Identifier (GPSI), and User Location information, such as similarly described above (e.g., and/or in combination with other DPI-based firewall techniques, such as Application-ID, user ID, content ID, URL filtering, etc.).

At 608, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 7:
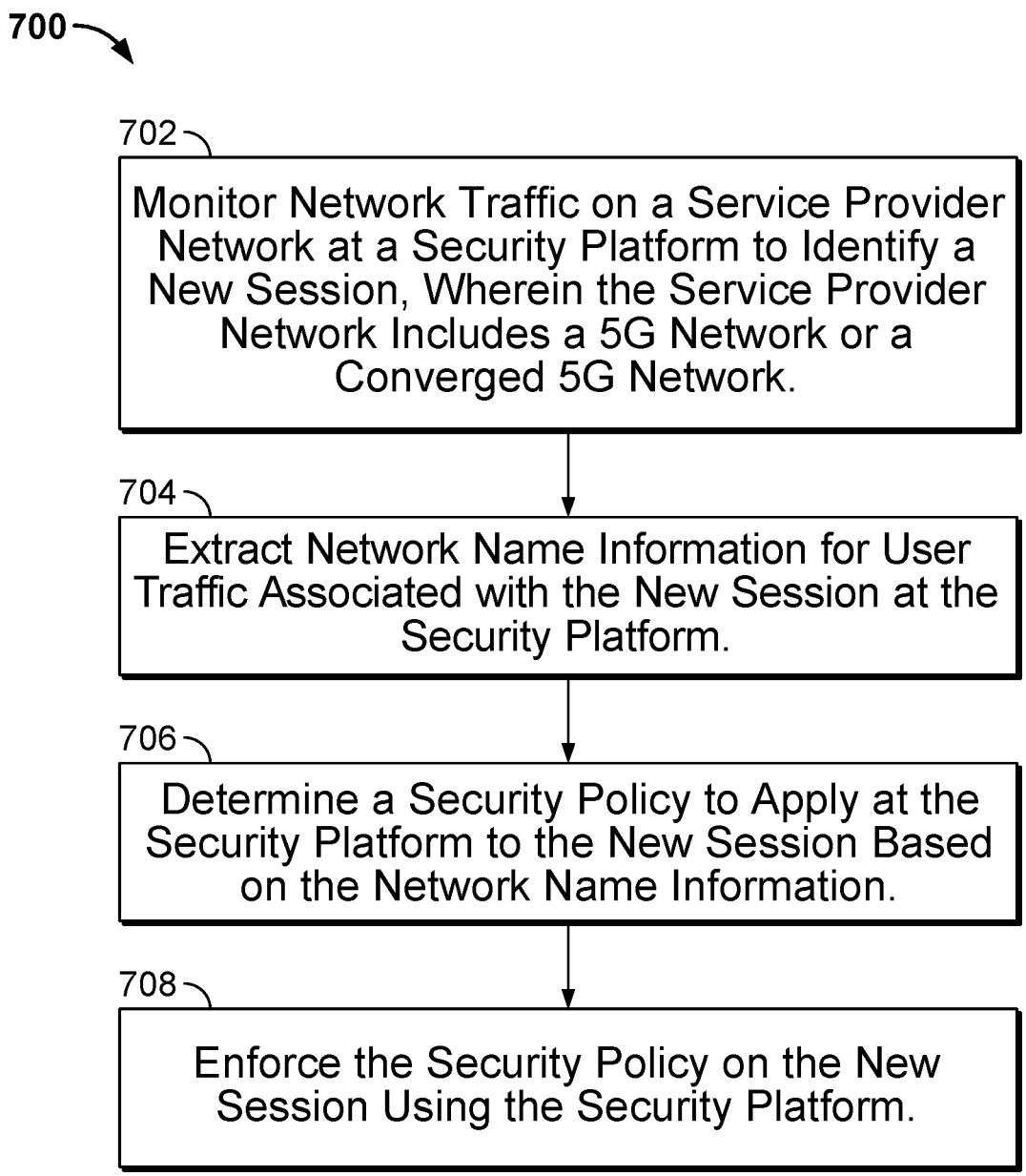
FIG. 7 is another flow diagram of a process for performing enhanced security for 5G networks for service providers in accordance with some embodiments.

FIG. 7 is another flow diagram of a process for performing enhanced security for 5G networks for service providers in accordance with some embodiments. In some embodiments, a process 700 as shown in FIG. 7 is performed by the security platform and techniques as similarly described above including the embodiments described above with respect to FIGS. 1A-4. In one embodiment, process 700 is performed by data appliance 300 as described above with respect to FIG. 3, network device 400 as described above with respect to FIG. 4, a virtual appliance, an SDN security solution, a cloud security service, and/or combinations or hybrid implementations of the aforementioned as described herein.

The process begins at 702. At 702, monitoring network traffic on a service provider network at a security platform to identify a new session, wherein the service provider network includes a 5G network or a converged 5G network, is performed. For example, the security platform (e.g., a firewall, a network sensor acting on behalf of the firewall, or another device/component that can implement security policies) can monitor GTP-U and HTTP/2 traffic on the mobile core network as similarly described above.

At 704, extracting network name information for user traffic associated with the new session at the security platform is performed. For example, the security platform can parse HTTP/2 messages to extract the network name information, in which the network name information is identified by a Data Network Name (DNN), using DPI-based firewall techniques as similarly described above.

At 706, determining a security policy to apply at the security platform to the new session based on the network name information is performed. For example, the security policy can be determined and/or enforced based on various combinations of Network Slice information, Data Network Name (DNN), Subscription Permanent Identifier (SUPI), Permanent Equipment Identifier (PEI), General Public Subscription Identifier (GPSI), and User Location information, such as similarly described above (e.g., and/or in combination with other DPI-based firewall techniques, such as Application-ID, user ID, content ID, URL filtering, etc.).

At 708, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 8:
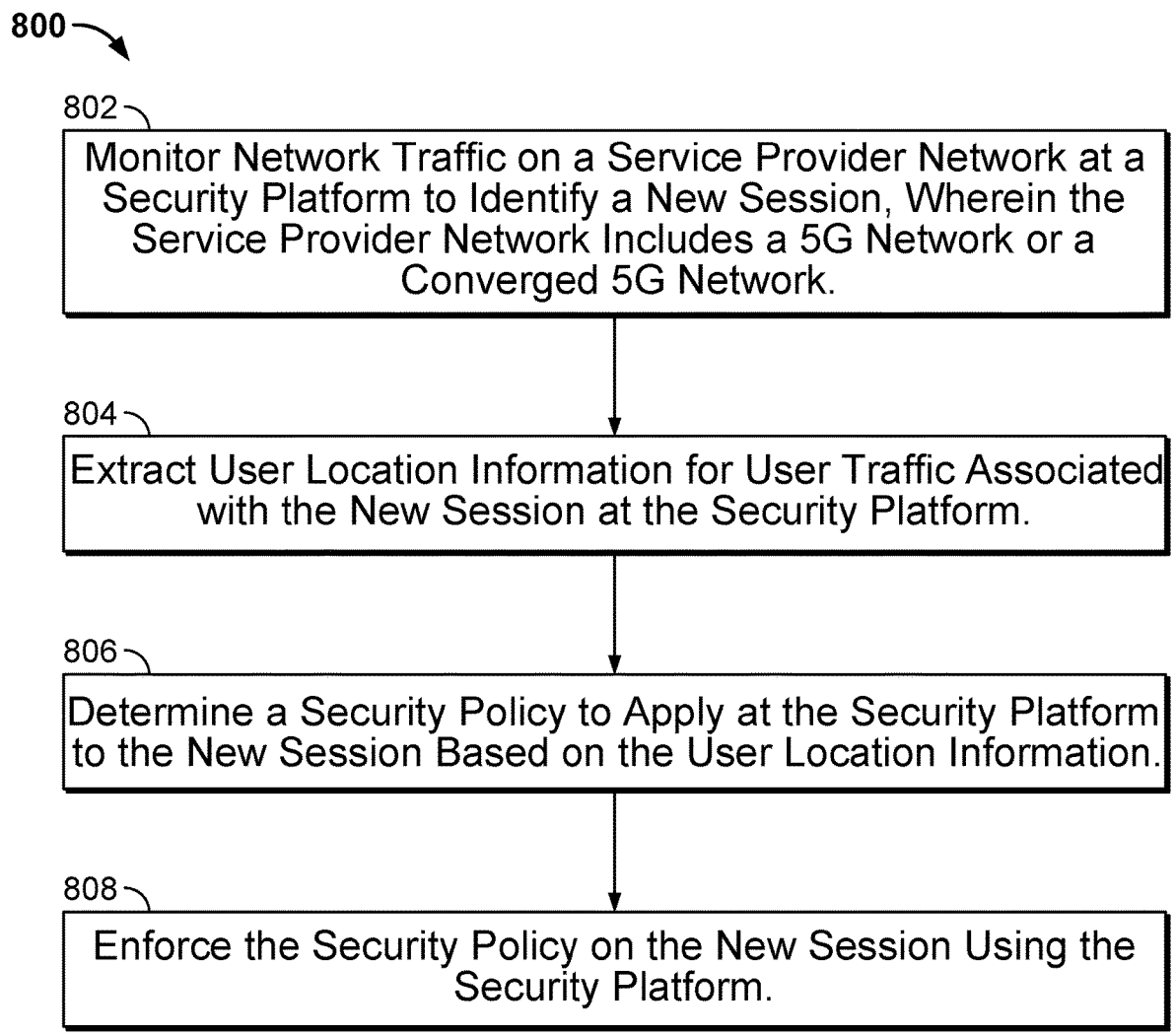
FIG. 8 is another flow diagram of a process for performing enhanced security for 5G networks for service providers in accordance with some embodiments.

FIG. 8 is another flow diagram of a process for performing enhanced security for 5G networks for service providers in accordance with some embodiments. In some embodiments, a process 800 as shown in FIG. 8 is performed by the security platform and techniques as similarly described above including the embodiments described above with respect to FIGS. 1A-4. In one embodiment, process 800 is performed by data appliance 300 as described above with respect to FIG. 3, network device 400 as described above with respect to FIG. 4, a virtual appliance, an SDN security solution, a cloud security service, and/or combinations or hybrid implementations of the aforementioned as described herein.

The process begins at 802. At 802, monitoring network traffic on a service provider network at a security platform to identify a new session, wherein the service provider network includes a 5G network or a converged 5G network, is performed. For example, the security platform (e.g., a firewall, a network sensor acting on behalf of the firewall, or another device/component that can implement security policies) can monitor GTP-U and HTTP/2 traffic on the mobile core network as similarly described above.

At 804, extracting user location information for user traffic associated with the new session at the security platform is performed. For example, the security platform can parse HTTP/2 messages to extract the user location information, in which the user location information is identified by a EutraLocation (e.g., Tracking Area Identity (TAI) and ECGI (EUTRA Cell Identity)) and/or an NRLocation (e.g., Tracking Area Identity (TAI) and NR Cell Identity (NCGI)), using DPI-based firewall techniques as similarly described above.

At 806, determining a security policy to apply at the security platform to the new session based on the user location information is performed. For example, the security policy can be determined and/or enforced based on various combinations of Network Slice information, Data Network Name (DNN), Subscription Permanent Identifier (SUPI), Permanent Equipment Identifier (PEI), General Public Subscription Identifier (GPSI), and User Location information, such as similarly described above (e.g., and/or in combination with other DPI-based firewall techniques, such as Application-ID, user ID, content ID, URL filtering, etc.).

At 808, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges on mobile networks, including 5G networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a service provider network at a security platform to identify a new session, wherein the service provider network includes a 5G network or a converged 5G network, wherein the monitoring of the network traffic further comprises to:
identify a create context request service operation or a create service operation in the network traffic;
extract network slice information for user traffic associated with the new session at the security platform, wherein the extracting the network slice information further comprises to:
parse HTTP/2 messages to extract the network slice information from the create context request service operation or the create service operation in the network traffic, and wherein the network slice is identified by Single Network Slice Selection Assistance Information (S-NSSAI); and
determine a security policy to apply at the security platform to the new session based on the network slice information; and
a memory coupled to the processor and configured to provide the processor with instructions.

2. The system recited in claim 1, wherein the security platform is configured with a plurality of security policies based on the network slice information.

3. The system recited in claim 1, wherein the security platform monitors wireless interfaces including a plurality of interfaces for a control protocol and user data traffic in a mobile core network for a 4G and/or 5G network.

4. The system recited in claim 1, wherein the security platform monitors wireless interfaces including a plurality of interfaces for a control protocol and user data traffic in a mobile core network for a 4G and/or 5G network to provide network slice-based security to subscribers and subscriber devices that connect to the service provider network using 5G radio access technology and handover from/to 5G radio access technologies to non-5G radio access technologies.

5. The system recited in claim 1, wherein the security platform is configured to perform a firewall service using the network slice information to apply security for a customer with a plurality of subscribers, a plurality of mobile subscribers, and/or a plurality of subscriber's devices.

6. The system recited in claim 1, wherein the security platform is configured to perform threat detection for known threats using the network slice information.

7. The system recited in claim 1, wherein the security platform is configured to perform advanced threat detection for unknown threats using the network slice information.

8. The system recited in claim 1, wherein the security platform is configured to perform Uniform Resource Link (URL) filtering using the network slice information.

9. The system recited in claim 1, wherein the security platform is configured to perform application Denial of Service (DoS) detection using the network slice information.

10. The system recited in claim 1, wherein the security platform is configured to perform application Denial of Service (DoS) prevention using the network slice information.

11. The system recited in claim 1, wherein the processor is further configured to:
block the new session from accessing a resource based on the security policy.

12. A method, comprising:
monitoring network traffic on a service provider network at a security platform to identify a new session, wherein the service provider network includes a 5G network or a converged 5G network, wherein the monitoring of the network traffic further comprises:
identifying a create context request service operation or a create service operation in the network traffic;
extracting network slice information for user traffic associated with the new session at the security platform, wherein the extracting the network slice information further comprises:
parsing HTTP/2 messages to extract the network slice information from the create context request service operation or the create service operation in the network traffic, and wherein the network slice is identified by Single Network Slice Selection Assistance Information (S-NSSAI); and
determining a security policy to apply at the security platform to the new session based on the network slice information.

13. The method of claim 12, wherein the security platform is configured with a plurality of security policies based on the network slice information.

14. The method of claim 12, wherein the security platform monitors wireless interfaces including a plurality of interfaces for a control protocol and user data traffic in a mobile core network for a 4G and/or 5G network to provide network slice-based security to subscribers and subscriber devices that connect to the service provider network using 5G radio access technology and handover from/to 5G radio access technologies to non-5G radio access technologies.

15. A computer program product, the computer program product being embodied in a tangible non-transitory computer readable storage medium and comprising computer instructions for:
monitoring network traffic on a service provider network at a security platform to identify a new session, wherein the service provider network includes a 5G network or a converged 5G network, wherein the monitoring of the network traffic further comprises:
identifying a create context request service operation or a create service operation in the network traffic;
extracting network slice information for user traffic associated with the new session at the security platform, wherein the extracting the network slice information further comprises:
parsing HTTP/2 messages to extract the network slice information from the create context request service operation or the create service operation in the network traffic, and wherein the network slice is identified by Single Network Slice Selection Assistance Information (S-NSSAI); and
determining a security policy to apply at the security platform to the new session based on the network slice information.

16. The computer program product recited in claim 15, wherein the security platform is configured with a plurality of security policies based on the network slice information.

* * * * *

UNITED STATES PATENT AND TRADEMARK OFFICE
CERTIFICATE OF CORRECTION

PATENT NO. : 10,944,796 B2
APPLICATION NO. : 16/144143
DATED : March 9, 2021
INVENTOR(S) : Sachin Verma and Leonid Burakovsky It is certified that error appears in the above-identified patent and that said Letters Patent is hereby corrected as shown below:

In the Specification

In Column 18, Line(s) 7, delete "WildFire" and insert --WildFireTM--, therefor.

Signed and Sealed this
Twenty-eighth Day of June, 2022

Katherine Kelly Vidal
Director of the United States Patent and Trademark Office